United States Patent
Gotoh et al.

(10) Patent No.: US 11,021,076 B2
(45) Date of Patent: Jun. 1, 2021

(54) CONTROL DEVICE OF VEHICLE

(71) Applicant: TOYOTA JIDOSHA KABUSHIKI KAISHA, Toyota (JP)

(72) Inventors: Jun Gotoh, Nagoya (JP); Kenta Kumazaki, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 15/994,188

(22) Filed: May 31, 2018

(65) Prior Publication Data
US 2018/0354368 A1 Dec. 13, 2018

(30) Foreign Application Priority Data

Jun. 8, 2017 (JP) .............................. JP2017-113837

(51) Int. Cl.
| B60W 10/26 | (2006.01) |
| B60W 10/08 | (2006.01) |
| B60K 6/445 | (2007.10) |
| B60L 50/64 | (2019.01) |
| B60L 58/12 | (2019.01) |
| B60L 50/61 | (2019.01) |

(52) U.S. Cl.
CPC .............. *B60L 58/12* (2019.02); *B60K 6/445* (2013.01); *B60L 50/61* (2019.02); *B60W 10/08* (2013.01); *B60W 10/26* (2013.01); *B60L 2210/14* (2013.01); *B60W 2710/086* (2013.01)

(58) Field of Classification Search
CPC ......... B60L 11/123; B60L 58/12; B60L 50/61
See application file for complete search history.

(56) References Cited

U.S. PATENT DOCUMENTS

| 6,757,598 | B2 * | 6/2004 | Okoshi | ................ | B60K 6/365 |
| | | | | | 701/22 |
| 6,762,945 | B2 * | 7/2004 | Morgen | ................ | G05F 1/465 |
| | | | | | 363/17 |

(Continued)

FOREIGN PATENT DOCUMENTS

| JP | 2007015565 A | * | 1/2007 |
| WO | WO 2011/125187 A1 | | 10/2011 |
| WO | WO 2012/105021 A1 | | 8/2012 |

OTHER PUBLICATIONS

Nakajima, Engine Start Controller For Hybrid Car, 2007 (Year: 2007).*

*Primary Examiner* — Fadey S. Jabr
*Assistant Examiner* — Omar K Morsy
(74) *Attorney, Agent, or Firm* — Oblon, McClelland, Maier & Neustadt, L.L.P.

(57) ABSTRACT

A control device of a vehicle includes an electronic control unit configured to selectively execute a first operation control for traveling based on a driving operation of a driver and a second operation control for traveling by setting a target traveling state independently of the driving operation of the driver and automatically performing acceleration or deceleration based on the target traveling state, and set an input voltage of an inverter set in the second operation control to be lower than the input voltage of the inverter set in the first operation control when an operating state of a rotating device represented by an output torque and a rotational speed of the rotating device is not changed.

13 Claims, 9 Drawing Sheets

(56) References Cited

U.S. PATENT DOCUMENTS

| | | | | |
|---|---|---|---|---|
| 7,108,087 B2* | 9/2006 | Imai | ............... | B60W 20/10 |
| | | | | 180/65.23 |
| 7,828,093 B2* | 11/2010 | Hanada | ............ | B60K 6/365 |
| | | | | 180/65.265 |
| 7,997,364 B2* | 8/2011 | Hashimoto | ........ | B60W 20/10 |
| | | | | 180/65.265 |
| 8,287,426 B2* | 10/2012 | Heap | ............... | B60W 50/04 |
| | | | | 477/3 |
| 9,734,455 B2* | 8/2017 | Levinson | ............ | G06N 7/005 |
| 9,884,631 B2* | 2/2018 | James | ............... | B60W 50/082 |
| 10,437,257 B2* | 10/2019 | Urano | ............... | B60W 50/14 |
| 2013/0030633 A1* | 1/2013 | Yamamoto | ........ | B60W 10/08 |
| | | | | 701/22 |
| 2013/0317682 A1 | 11/2013 | Morisaki | | |
| 2015/0210267 A1* | 7/2015 | Sato | ............... | B60W 10/06 |
| | | | | 701/22 |
| 2016/0121741 A1* | 5/2016 | Kim | ............... | B60L 58/10 |
| | | | | 318/139 |

* cited by examiner

CONTROL DEVICE OF VEHICLE

INCORPORATION BY REFERENCE

The disclosure of Japanese Patent Application No. 2017-113837 filed on Jun. 8, 2017 including the specification, drawings and abstract is incorporated herein by reference in its entirety.

BACKGROUND

1. Technical Field

The present disclosure relates to a control device of a vehicle that includes a rotating device, an inverter, a battery, and a boost converter.

2. Description of Related Art

A control device of a vehicle that includes a rotating device, an inverter, a battery, and a boost converter is well known. The rotating device can generate a drive torque. The inverter controls the output torque of the rotating device. The battery supplies electric power to the rotating device through the inverter. The boost converter is disposed between the inverter and the battery and boosts the input voltage of the inverter to a voltage higher than the output voltage of the battery. For example, a hybrid vehicle is disclosed in WO 2012/105021. In the disclosure of WO 2012/105021, the hybrid vehicle includes an engine and a motor, and fuel efficiency is improved by setting the input voltage of the inverter to be lower in a motor traveling (referred to as electric vehicle (EV) traveling) mode where traveling is performed in a state where the engine is stopped, than in a hybrid traveling (referred to as hybrid vehicle (HV) traveling) mode where traveling is performed using the engine and the motor by operating the engine.

SUMMARY

In the case of setting the input voltage of an inverter to be lower than that in a hybrid traveling mode, when a drive torque is desired to be increased, there is a possibility of causing a delay in acceleration response or an excessive change in torque when the acceleration capability is prioritized. A vehicle that can selectively perform a first operation control and a second operation control is considered. The first operation control is for traveling based on a driving operation of a driver. The second operation control is for traveling by setting a target traveling state independently of a driving operation of the driver and automatically performing acceleration or deceleration based on the target traveling state. In such a vehicle, in the second operation control where the driver does not perform an acceleration or deceleration operation, compared to the first operation control, it is considered that rapid acceleration requests do not occur frequently, and that a delay in acceleration response is unlikely to be recognized by the driver. Thus, when the input voltage of the inverter corresponding to the operating state of the vehicle is set to a uniform value in preparation for the rapid acceleration request and the like regardless of the difference in operation control, there is a possibility of a decrease in vehicle efficiency (for example, a decrease in fuel efficiency).

The present disclosure provides a control device of a vehicle that can improve fuel efficiency in the vehicle which can selectively perform a first operation control and a second operation control.

An aspect of the present disclosure relates to a control device of a vehicle. The vehicle includes a rotating device, an inverter, a battery, and a boost converter. The rotating device is configured to generate a drive torque of the vehicle. The inverter is configured to control an output torque of the rotating device. The battery is connected to the boost converter to supply electric power to the rotating device through the inverter and the boost converter. The boost converter is interposed between the inverter and the battery. The boost converter is configured to boost an input voltage of the inverter to a voltage higher than an output voltage of the battery. The control device of the vehicle includes an electronic control unit configured to selectively execute a first operation control for traveling based on a driving operation of a driver and a second operation control for traveling by setting a target traveling state independently of the driving operation of the driver and automatically performing acceleration or deceleration based on the target traveling state, and set the input voltage of the inverter set in the second operation control to be lower than the input voltage of the inverter set in the first operation control when an operating state of the rotating device represented by the output torque and a rotational speed of the rotating device is not changed.

In the control device according to the aspect of the present disclosure, the electronic control unit may be configured to automatically set the target traveling state based on at least one of map information or road information in the second operation control. The electronic control unit may be configured to execute an automatic operation control for traveling by automatically performing acceleration or deceleration and steering based on the target traveling state in the second operation control.

In the control device according to the aspect of the present disclosure, the electronic control unit may be configured to set the input voltage of the inverter in accordance with an operating state of the vehicle.

In the control device according to the aspect of the present disclosure, the electronic control unit may be configured to set the input voltage of the inverter in accordance with the operating state represented by the output torque and the rotational speed of the rotating device or an operating state represented by a vehicle speed and a requested drive torque for the vehicle.

In the control device according to the aspect of the present disclosure, the electronic control unit may be configured to set the input voltage of the inverter set in the second operation control to be lower than the input voltage of the inverter set in the first operation control by setting an upper limit value of the input voltage of the inverter in the second operation control.

In the control device according to the aspect of the present disclosure, the electronic control unit may be configured to control the rotating device to generate the drive torque within a range of the output torque of the rotating device restricted in accordance with the upper limit value of the input voltage of the inverter in the second operation control.

In the control device according to the aspect of the present disclosure, the vehicle may include an engine. The electronic control unit may be configured to temporarily set the input voltage of the inverter to be high at a start-up of the engine. The electronic control unit may be configured to set a boost time period in which the input voltage of the inverter is temporarily set to be high at the start-up of the engine in the second operation control, to be longer than a boost time period in which the input voltage of the inverter is temporarily set to be high at the start-up of the engine in the first operation control.

In the control device according to the aspect of the present disclosure, the electronic control unit may be configured to selectively execute, as the second operation control, an unmanned second operation control based on unmanned traveling in which the acceleration or deceleration is automatically performed in an absence of an occupant in the vehicle, and a manned second operation control based on manned traveling in which the acceleration or deceleration is automatically performed in a presence of an occupant in the vehicle. The electronic control unit may be configured to set the boost time period in the manned second operation control to be longer than the boost time period in the first operation control and set the boost time period in the unmanned second operation control to be shorter than the boost time period in the first operation control.

In the control device according to the aspect of the present disclosure, the electronic control unit may be configured to selectively execute, as a drive control of the rotating device, a drive control based on pulse width modulation control and a drive control based on rectangular wave control. The electronic control unit may be configured to enlarge an operating region of the rotating device under the pulse width modulation control as the input voltage of the inverter is increased.

In the control device according to the aspect of the present disclosure, the electronic control unit may be configured to execute a damping control using the rotating device merely in the drive control based on the pulse width modulation control.

In the control device according to the aspect of the present disclosure, the electronic control unit may be configured to selectively execute, as the second operation control, an unmanned second operation control based on unmanned traveling in which the acceleration or deceleration is automatically performed in an absence of an occupant in the vehicle, and a manned second operation control based on manned traveling in which the acceleration or deceleration is automatically performed in a presence of an occupant in the vehicle. The electronic control unit may be configured to set the input voltage of the inverter in the unmanned second operation control to be lower than the input voltage of the inverter in the manned second operation control when the operating state of the rotating device is not changed.

In the control device according to the aspect of the present disclosure, the vehicle may include an engine and a first rotating device that generates electric power for charging the battery using power of the engine and rotationally drives the engine using the electric power supplied from the battery at a start-up of the engine. The rotating device may be a second rotating device that generates the drive torque using the electric power supplied from the battery.

In the control device according to the aspect of the present disclosure, the vehicle may include an engine. The rotating device may include a function as an electric power generator that generates electric power for charging the battery using power of the engine, a function as a starter that rotationally drives the engine using the electric power supplied from the battery at a start-up of the engine, and a function as an electric motor that generates the drive torque using the electric power supplied from the battery.

According to the aspect of the present disclosure, in the second operation control, the input voltage of the inverter when the operating state of the rotating device is not changed is set to be lower than that in the first operation control. Thus, electric power loss (switching loss) in the boost converter and the inverter in the second operation control is decreased further than a case where the input voltage of the inverter when the operating state of the rotating device is not changed is set to the same value in the second operation control and the first operation control. In the second operation control for traveling by automatically performing acceleration or deceleration, a situation where the traveling state of the vehicle is rapidly changed is more restricted than that in the first operation control for traveling based on a driving operation of the driver. Thus, in the second operation control, it is considered that even when a delay in acceleration response is caused by decreasing the input voltage of the inverter, the delay in acceleration response does not occur frequently, and the delay in acceleration response is unlikely to be recognized by the driver. From such a viewpoint, in the second operation control, improvement in fuel efficiency is prioritized over improvement in drivability, and the input voltage of the inverter is set to be lower than that in the first operation control. Thus, vehicle efficiency can be improved (that is, fuel efficiency can be improved) in the vehicle that can selectively perform the first operation control and the second operation control.

According to the aspect of the present disclosure, furthermore, fuel efficiency can be improved in the vehicle that executes the automatic operation control in the second operation control for traveling by automatically setting the target traveling state based on at least one of the map information or the road information and automatically performing acceleration or deceleration and steering based on the target traveling state.

According to the aspect of the present disclosure, furthermore, the input voltage of the inverter is set in accordance with the operating state of the vehicle, and fuel efficiency can be improved.

According to the aspect of the present disclosure, the operating state of the vehicle is either the operating state represented by the output torque and the rotational speed of the rotating device or the operating state represented by the vehicle speed and the requested drive torque for the vehicle. Thus, the input voltage of the inverter is appropriately set in accordance with the output torque and the rotational speed of the rotating device, or the vehicle speed and the requested drive torque.

According to the aspect of the present disclosure, furthermore, the input voltage of the inverter set in the second operation control is set to be lower than the input voltage of the inverter set in the first operation control by setting the upper limit value of the input voltage of the inverter in the second operation control. Thus, a region of the input voltage of the inverter where electric power loss in the boost converter and the inverter is decreased is used in the second operation control.

According to the aspect of the present disclosure, furthermore, the drive torque is generated within the range of the output torque of the rotating device restricted in accordance with the upper limit value of the input voltage of the inverter in the second operation control. Thus, a region of the input voltage of the inverter where electric power loss in the boost converter and the inverter is decreased is appropriately used in the second operation control.

According to the aspect of the present disclosure, furthermore, the vehicle includes an engine. The input voltage of the inverter is temporarily set to be high at the start-up of the engine. The boost time period in which the input voltage of the inverter is temporarily set to be high at the start-up of the engine in the second operation control is set to be longer than the boost time period in which the input voltage of the inverter is temporarily set to be high at the start-up of the engine in the first operation control. Thus, improvement in drivability (for example, suppression of an engine start-up shock) is prioritized over improvement in fuel efficiency.

According to the aspect of the present disclosure, furthermore, the boost time period in the manned second operation control is longer than the boost time period in the first operation control. Thus, in the manned second operation control where the engine start-up shock is more easily recognized than that in the first operation control, improvement in drivability is prioritized over improvement in fuel efficiency. The boost time period in the unmanned second operation control is shorter than the boost time period in the first operation control. Thus, in the unmanned second operation control where the engine start-up shock is not recognized, fuel efficiency can be improved.

According to the aspect of the present disclosure, furthermore, the operating region of the rotating device under the pulse width modulation control is enlarged as the input voltage of the inverter is increased. Thus, even when the input voltage of the inverter is changed in the first operation control and the second operation control, the drive control of the rotating device is appropriately performed in accordance with the input voltage of the inverter.

According to the aspect of the present disclosure, furthermore, the damping control using the rotating device is performed merely in the drive control based on the pulse width modulation control. Thus, in the drive control based on the pulse width modulation control, vibrations in the vehicle can be reduced.

According to the aspect of the present disclosure, furthermore, the input voltage of the inverter in the unmanned second operation control is set to be lower than the input voltage of the inverter in the manned second operation control when the operating state of the rotating device is not changed. Thus, electric power loss in the boost converter and the inverter in the unmanned second operation control is decreased further than that in the manned second operation control. In the unmanned second operation control where a delay in acceleration response is not recognized, improvement in fuel efficiency is further prioritized than that in the manned second operation control, and fuel efficiency can be further improved by setting the input voltage of the inverter to be low.

According to the aspect of the present disclosure, furthermore, the vehicle includes an engine, a first rotating device that generates electric power for charging the battery using power of the engine and rotationally drives the engine using the electric power supplied from the battery at a start-up of the engine, and a second rotating device that generates the drive torque using the electric power supplied from the battery. Thus, in the second operation control, the input voltage of the inverter when the operating state of each of the first and second rotating devices is the same is set to be lower than that in the first operation control, and electric power loss in the boost converter and the inverter in the second operation control is decreased.

According to the aspect of the present disclosure, furthermore, the vehicle includes an engine, and the rotating device includes a function as an electric power generator that generates electric power for charging the battery using power of the engine, a function as a starter that rotationally drives the engine using the electric power supplied from the battery at a start-up of the engine, and a function as an electric motor that generates the drive torque using the electric power supplied from the battery. Thus, in the second operation control, the input voltage of the inverter when the operating state of the rotating device is not changed is set to be lower than that in the first operation control, and electric power loss in the boost converter and the inverter in the second operation control is decreased.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure will be specifically described with reference to the drawings.

Figure 1:
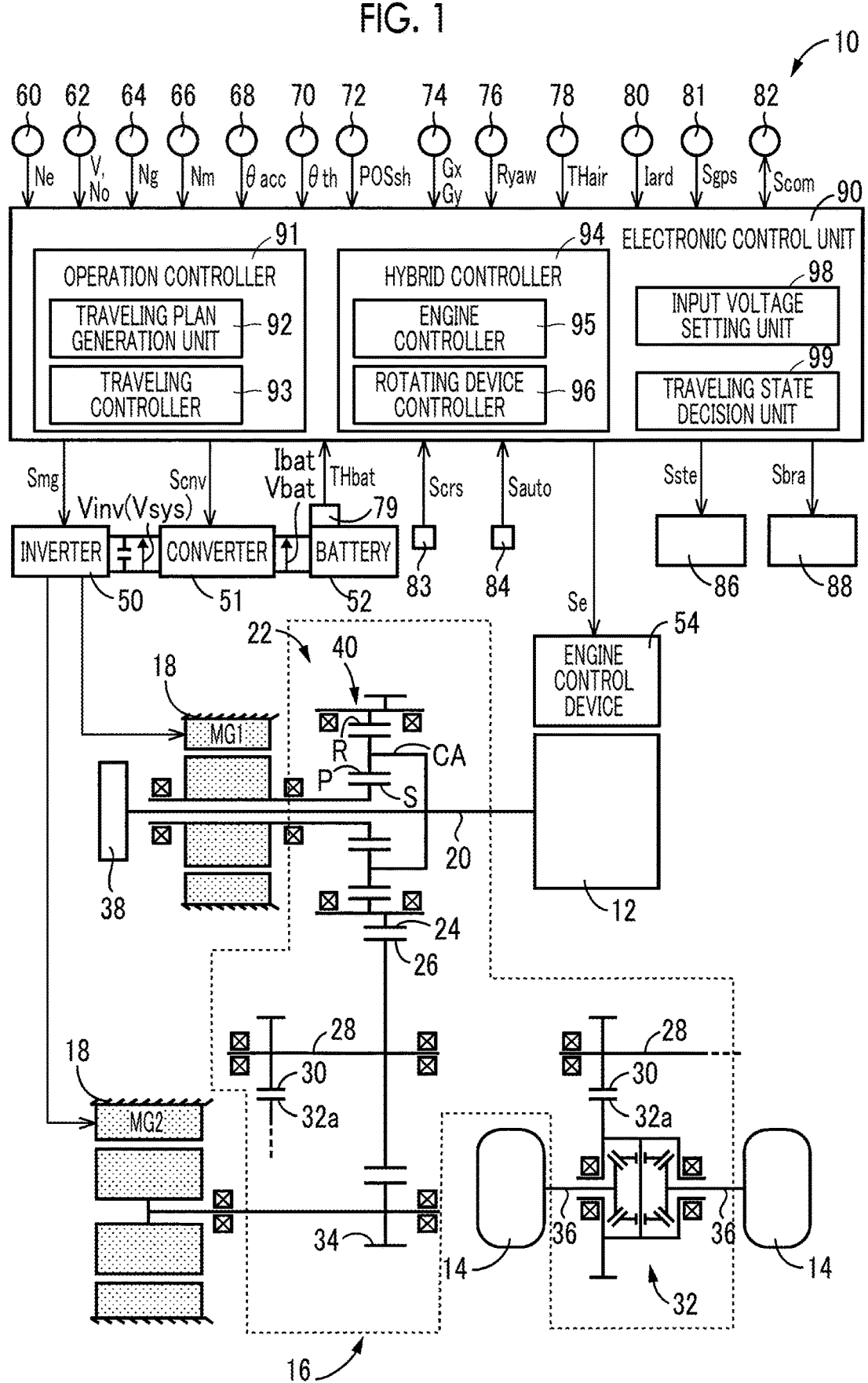
FIG. 1 is a diagram for describing a schematic configuration of each unit related to traveling of a vehicle to which the present disclosure is applied, and is also a diagram for describing a control system and a main part of control functions for controlling each unit.

Hereinafter, a first embodiment of the present disclosure will be described. FIG. 1 is a diagram for describing a schematic configuration of each unit related to traveling of a vehicle 10 to which the present disclosure is applied, and is also a diagram for describing a control system and a main part of control functions for controlling each unit. In FIG. 1, the vehicle 10 is a hybrid vehicle that includes an engine 12 and a second rotating device MG2 as a power source which can generate a drive torque. The vehicle 10 includes drive wheels 14, a power transmission device 16, and a first rotating device MG1. The power transmission device 16 is disposed on a power transmission path between the engine 12 and the drive wheels 14.

The engine 12 is a well-known internal combustion engine such as a gasoline engine and a diesel engine. An electronic control unit 90 described below controls the operating state of the engine 12 such as a throttle valve opening degree θth, the amount of intake air, the amount of supplied fuel, or an ignition timing, thereby controlling an engine torque Te that is the output torque of the engine 12.

Each of the first rotating device MG1 and the second rotating device MG2 is a so-called motor generator and is a rotating electric device that includes a function as an electric motor (motor) and also a function as an electric power generator (generator). Each of the first rotating device MG1 and the second rotating device MG2 is connected to a battery 52 included in the vehicle 10 through an inverter 50 and a boost converter 51 included in the vehicle 10. The electronic control unit 90 described below controls the inverter 50 to control an MG1 torque Tg and an MG2 torque Tm that are the output torques (powering torque or regenerative torque) of the first rotating device MG1 and the second rotating device MG2, respectively.

The inverter 50 is connected to each of the first rotating device MG1 and the second rotating device MG2. The inverter 50 controls exchange of electric power related to the operation of each of the first rotating device MG1 and the second rotating device MG2 in order to acquire the MG1 torque Tg requested for the first rotating device MG1 and the MG2 torque Tm requested for the second rotating device MG2. The battery 52 is an electric power storage device that exchanges electric power with each of the first rotating device MG1 and the second rotating device MG2 through the inverter 50. Specifically, the battery 52 is an electric power storage device that can store electric power generated by each of the first rotating device MG1 and the second rotating device MG2 and supply the stored electric power to each of the first rotating device MG1 and the second rotating device MG2. The boost converter 51 is disposed between the inverter 50 and the battery 52. The boost converter 51 includes a well-known reactor, a switching element, and the like. The electronic control unit 90 described below switches the switching element between ON and OFF states to boost the voltage on the battery 52 side or buck the voltage on the inverter 50 side. Accordingly, an inverter input voltage Vinv that is the input voltage of the inverter 50 is boosted by the boost converter 51 to a voltage higher than a battery voltage Vbat that is the output voltage of the battery 52. In the first embodiment, the inverter input voltage Vinv is referred to as a system voltage Vsys.

The power transmission device 16 includes an input shaft 20, a shift unit 22, a driven gear 26, a driven shaft 28, a final gear 30 (a final gear 30 having a smaller diameter than the driven gear 26), a differential gear 32, a reduction gear 34 (a reduction gear 34 having a smaller diameter than the driven gear 26), and the like in a case 18 that is a non-rotating member attached to the vehicle body. The input shaft 20 is connected to the engine 12 directly or indirectly through a damper or the like not illustrated. The shift unit 22 is connected to the input shaft 20. The driven gear 26 meshes with a drive gear 24 that is a rotating output member of the shift unit 22. The driven shaft 28 is fixedly disposed to be incapable of rotating relative to the driven gear 26. The final gear 30 is fixedly disposed to be incapable of rotating relative to the driven shaft 28. The differential gear 32 meshes with the final gear 30 through a differential ring gear 32a. The reduction gear 34 meshes with the driven gear 26 and is connected to the second rotating device MG2. The power transmission device 16 includes an axle 36 and the like that are connected to the differential gear 32. In the power transmission device 16 having such a configuration, power (or torque or force unless otherwise specified) output from the engine 12 or power output from the second rotating device MG2 is transmitted to the driven gear 26 and is transmitted to the drive wheels 14 from the driven gear 26 through the final gear 30, the differential gear 32, the axle 36, and the like in order. In the power transmission device 16, a mechanical oil pump 38 that is included in the vehicle 10 and connected to the input shaft 20 to be rotationally driven by the engine 12 supplies oil used for lubricating or cooling each unit of the power transmission device 16 such as a planetary gear mechanism 40 described below and a ball bearing.

The shift unit 22 includes the planetary gear mechanism 40 as a power split device that splits (or distributes) the power transmitted from the engine 12 through the input shaft 20 to the first rotating device MG1 and the drive gear 24. The planetary gear mechanism 40 is a well-known single pinion planetary gear device that includes a sun gear S, a pinion gear P, a carrier CA, and a ring gear R. The carrier CA supports the pinion gear P in a manner allowing rotation and revolution of the pinion gear P. The ring gear R meshes with the sun gear S through the pinion gear P. The planetary gear mechanism 40 functions as a differential mechanism that generates a differential effect. In the planetary gear mechanism 40, the sun gear S is connected to the first rotating device MG1, and the carrier CA is connected to the engine 12 through the input shaft 20. The ring gear R is formed on the inner circumferential surface of the drive gear 24. Thus, in the vehicle 10, HV traveling described below can be performed using a directly transmitted torque (referred to as a directly transmitted engine torque) that is mechanically transmitted to the ring gear R by acquiring the reaction force of the engine torque Te input to the carrier CA in the first rotating device MG1, and the MG2 torque Tm that is output from the second rotating device MG2 by driving the second rotating device MG2 with the electric power which is generated by the first rotating device MG1 using the power of the engine 12 split to the first rotating device MG1. Accordingly, the shift unit 22 functions as a well-known electric differential unit (electric continuously variable transmission) of which the gear ratio (shift ratio) is controlled by controlling the operating state of the first rotating device MG1 through control of the inverter 50 by the electronic control unit 90 described below. As described above, the second rotating device MG2 is a rotating device that can generate a drive torque. In the vehicle 10, EV traveling described below can be performed using the MG2 torque Tm by driving the second rotating device MG2 with the electric power supplied from the battery 52 in a state where the operation of the engine 12 is stopped.

The operation of the vehicle 10 in an HV traveling mode where the HV traveling is performed will be described. The MG1 torque Tg is input to the sun gear S in response to the engine torque Te that is input to the carrier CA. At such a time, for example, a control for setting the operating point of the engine 12 represented by an engine rotational speed Ne and the engine torque Te to an operation point where the best fuel efficiency is achieved can be executed by performing a powering control or a reaction force control of the first rotating device MG1. Such a hybrid type is referred to as a power split type or a split type.

The operation of the vehicle 10 in an EV traveling mode where the EV traveling is performed will be described. The engine 12 is not driven (that is, the engine 12 is in a state where the operation of the engine 12 is stopped), and the first rotating device MG1 is in a state where the first rotating device MG1 does not have a load (free). The engine rotational speed Ne is equal to zero. In such a state, the powering torque of the second rotating device MG2 is transmitted to the drive wheels 14 as a drive torque in a forward direction of the vehicle.

The vehicle 10 further includes the electronic control unit 90 as a controller that includes a control device of the vehicle 10 related to control of the engine 12, the first rotating device MG1, the second rotating device MG2, and the like. The electronic control unit 90 is configured to include a so-called microcomputer that includes a central processing unit (CPU), a random access memory (RAM), a read-only memory (ROM), input and output interfaces, and the like. The CPU executes various controls of the vehicle 10 by performing signal processing in accordance with a program stored in advance in the ROM while using a temporary storage function of the RAM. The electronic control unit 90 is configured to include each computer for engine control, rotating device control, and the like when needed.

The electronic control unit 90 is supplied with various signals and the like (for example, the engine rotational speed Ne, an output rotational speed No that is the rotational speed of the drive gear 24 corresponding to a vehicle speed V, an MG1 rotational speed Ng that is the rotational speed of the first rotating device MG1, an MG2 rotational speed Nm that is the rotational speed of the second rotating device MG2, an accelerator operation amount $\theta$acc that is the amount of acceleration operation (that is, the amount of operation of an accelerator pedal) of the driver representing the magnitude of the acceleration operation of the driver, the throttle valve opening degree $\theta$th that is the opening degree of an electronic throttle valve, an operating position (shift position) POSsh of a shift lever such as "P", "R", "N", and "D", a front-rear acceleration Gx of the vehicle 10, a right-left acceleration Gy of the vehicle 10, a yaw rate Ryaw that is the rotational angular velocity of the vehicle 10 about a vertical axis, an outside air temperature THair around the vehicle 10, a battery temperature THbat, a battery charging and discharging current Ibat, and a battery voltage Vbat of the battery 52, vehicle surrounding area information Iard, a GPS signal (trajectory signal) Sgps, a communication signal Scom, a cruise control signal Scrs, and an automatic operation selection signal Sauto) based on the detected values of various sensors and the like (for example, an engine rotational speed sensor 60, an output rotational speed sensor 62, an MG1 rotational speed sensor 64 such as a resolver, an MG2 rotational speed sensor 66 such as a resolver, an accelerator operation amount sensor 68, a throttle valve opening degree sensor 70, a shift position sensor 72, a G sensor 74, a yaw rate sensor 76, an outside air temperature sensor 78, a battery sensor 79, a course recognition and obstacle detection sensor 80 such as a vehicle-mounted camera, a global positioning system (GPS) antenna 81, an external network communication antenna 82, a cruise control switch 83 for the driver to set traveling under cruise control, and an automatic operation selection switch 84 for the driver to select automatic operation) included in the vehicle 10. The electronic control unit 90 outputs various instruction signals (for example, an engine control instruction signal Se for controlling the engine 12, a rotating device control instruction signal Smg for operating the inverter 50 that controls each of the rotating devices MG1, MG2, a converter control instruction signal Scnv for operating the boost converter 51 to acquire the set system voltage Vsys (inverter input voltage Vinv), the communication signal Scom, a steering signal Sste for operating a steering actuator 86 that controls steering of wheels (particularly, front wheels), and a brake signal Sbra for operating a brake actuator 88 that controls a footbrake) to each device (for example, an engine control device 54 such as a throttle actuator, a fuel injection device, and an ignition device, the inverter 50, the boost converter 51, the external network communication antenna 82, the steering actuator 86, and the brake actuator 88) included in the vehicle 10.

The electronic control unit 90 calculates a battery SOC value [%] that is a value representing the state of charge (SOC) of the battery 52, based on the battery charging and discharging current Ibat and the like. The electronic control unit 90 calculates chargeable electric power (inputtable electric power) Win and dischargeable electric power (outputtable electric power) Wout based on, for example, the battery temperature THbat and the battery SOC value. The chargeable electric power Win defines the limit of the input electric power of the battery 52. The dischargeable electric power Wout defines the limit of the output electric power of the battery 52. For example, in a low temperature region where the battery temperature THbat is lower than that in a normal use region, the chargeable electric power Win and the dischargeable electric power Wout are decreased as the battery temperature THbat is decreased. In a high temperature region where the battery temperature THbat is higher than that in the normal use region, the chargeable electric power Win and the dischargeable electric power Wout are decreased as the battery temperature THbat is increased. For example, in a region where the battery SOC value is high, the chargeable electric power Win is decreased as the battery SOC value is increased. For example, in a region where the battery SOC value is low, the dischargeable electric power Wout is decreased as the battery SOC value is decreased.

The electronic control unit 90 includes operation control means, that is, an operation controller 91, hybrid control means, that is, a hybrid controller 94, and input voltage setting means, that is, an input voltage setting unit 98, in order to implement control functions for various controls in the vehicle 10.

As an operation control of the vehicle 10, the operation controller 91 can selectively perform a manual operation control for traveling based on a driving operation of the driver and an automatic operation control for traveling by automatically setting a target traveling state based on at least one of map information or road information and automatically performing acceleration or deceleration and steering based on the target traveling state. The manual operation control is an operation control for traveling under manual operation based on a driving operation of the driver. The manual operation is an operation method of causing the vehicle 10 to normally travel by a driving operation of the driver such as an accelerator operation, a brake operation, and a steering operation. The automatic operation control is an operation control for traveling under automatic operation. The automatic operation is an operation method of causing the vehicle 10 to travel by automatically performing acceleration or deceleration, braking, steering, and the like under control of the electronic control unit 90 based on the signal, information, and the like from various sensors independently of a driving operation (intention) of the driver.

The operation controller 91 executes the manual operation control when the automatic operation is not selected in the automatic operation selection switch 84. The operation controller 91 executes the manual operation control by controlling each of the engine 12 and the rotating devices MG1, MG2 based on the accelerator operation amount θacc and the like.

The operation controller 91 executes the automatic operation control when the driver operates the automatic operation selection switch 84 to select the automatic operation. The operation controller 91 executes the automatic operation control by controlling each of the engine 12 and the rotating devices MG1, MG2 based on the signal, information, and the like from various sensors and also operating the steering actuator 86 and the brake actuator 88.

Figure 2:
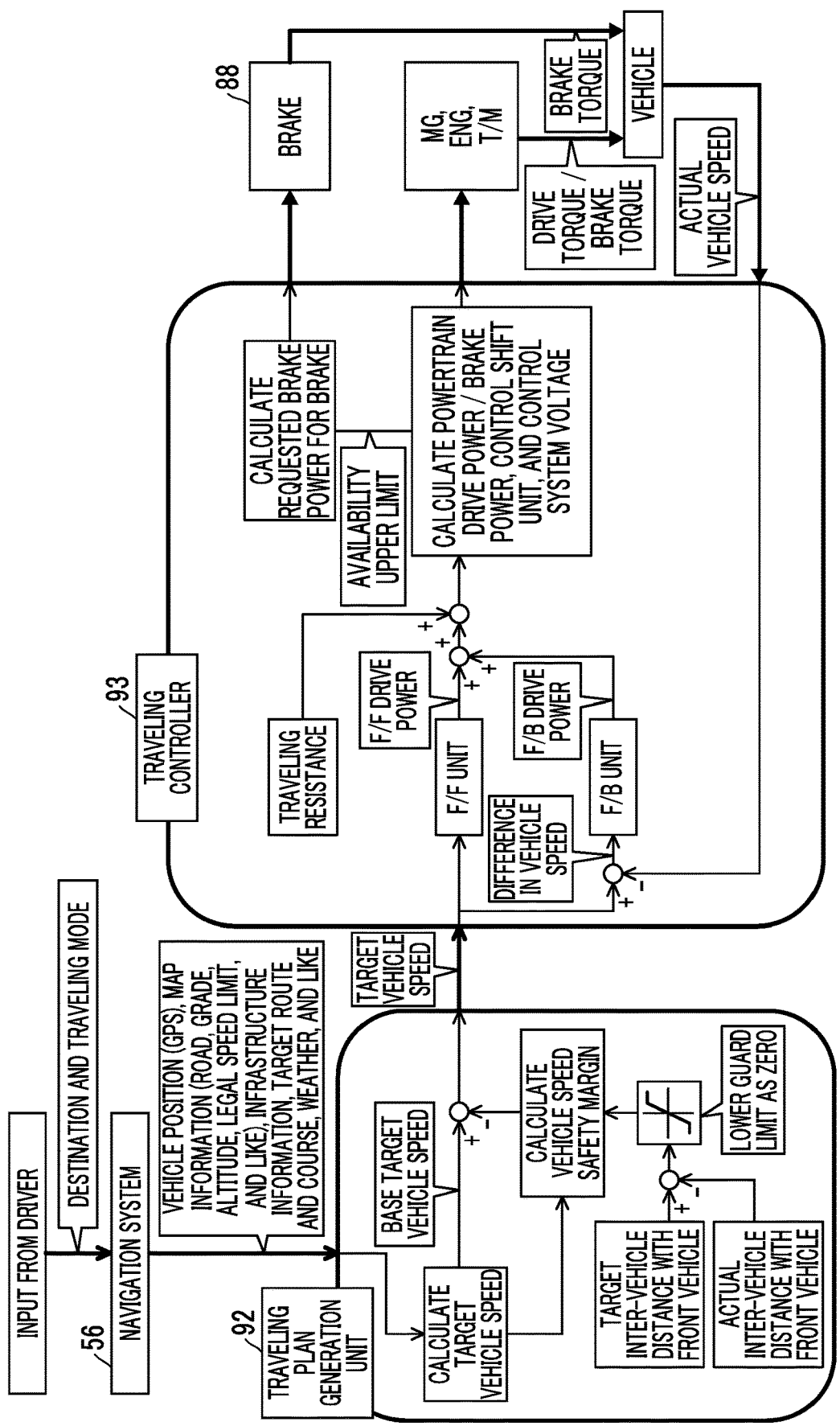
FIG. 2 is a diagram for describing a control corresponding to a part of an automatic operation control.

Specifically, the operation controller 91 includes traveling plan generation means, that is, a traveling plan generation unit 92, for generating a traveling plan, and traveling control means, that is, a traveling controller 93. As illustrated in FIG. 2, the traveling plan generation unit 92 uses various settings such as a destination, a traveling mode (time prioritized mode/fuel efficiency prioritized mode), and a set vehicle speed input by the driver, and at least one of information stored in, for example, a well-known navigation system 56 or information acquired by communicating with the outside of the vehicle to automatically set the target traveling state based on the vehicle position (GPS) the map information such as a road state including a curve and the like, a grade, an altitude, and a legal speed limit, infrastructure information, a target route and a target course, weather, and the like, and the road information such as a lane in the traveling road, a mark on the traveling road, and a pedestrian on the traveling road acquired by the course recognition and obstacle detection sensor 80 and the like. The traveling plan generation unit 92 sets a target vehicle speed as the target traveling state based on a target inter-vehicle distance with respect to a preceding vehicle or the inter-vehicle distance in actuality (referred to as the actual inter-vehicle distance) with respect to the preceding vehicle by considering a safety margin. The inter-vehicle distance may be the distance to a pedestrian, an obstacle, or a vehicle traveling alongside that is predicted to enter in front of the vehicle. When the value acquired by subtracting the actual inter-vehicle distance from the target inter-vehicle distance is a negative value, the inter-vehicle distance is sufficiently long. Thus, the traveling plan generation unit 92 sets a lower guard limit as zero for the value acquired by subtracting the actual inter-vehicle distance from the target inter-vehicle distance. Accordingly, the target vehicle speed is not increased when unneeded.

The traveling controller 93 performs the automatic operation control by automatically performing acceleration or deceleration and steering based on the target traveling state set by the traveling plan generation unit 92. The acceleration or deceleration means acceleration of the vehicle 10 and deceleration of the vehicle 10. The deceleration may include braking. As illustrated in FIG. 2, the traveling controller 93 calculates F/F drive power under feedforward control (F/F control) based on the target traveling state (target vehicle speed), and F/B drive power under feedback control (F/B control) based on the difference in vehicle speed between the target vehicle speed and the actual vehicle speed V. The traveling controller 93 calculates requested drive power or requested brake power of the power transmission device 16 (powertrain drive power/brake power in FIG. 2) based on the total drive power of the F/F drive power and the F/B drive power and traveling resistance. For example, a value that is set in advance in the vehicle 10 by the driver, a value that is based on the vehicle specifications or the map information acquired by communicating with the outside of the vehicle, or an estimated value that is calculated during traveling based on the gradient, the actual amount of drive power, the actual front-rear acceleration Gx, and the like is used as the traveling resistance. The traveling controller 93 outputs instructions to control the engine 12 and the rotating devices MG1, MG2 to the hybrid controller 94 in order to acquire the requested drive power (drive torque) or the requested brake power (brake torque). The traveling controller 93 outputs an instruction to control the system voltage Vsys to the boost converter 51 in order to acquire the system voltage Vsys set in accordance with the operating state of the vehicle 10 by the input voltage setting unit 98. The traveling controller 93 calculates the requested brake power acquired by the footbrake in its usable range and outputs an instruction to control the brake torque to the brake actuator 88 in order to acquire the requested brake power. Consequently, the engine 12, the rotating devices MG1, MG2, and the gear ratio of the shift unit 22 (T/M) are controlled to acquire the desired drive torque or brake torque. The brake torque is either an engine brake torque of the engine 12 or a regenerative brake torque of the second rotating device MG2. The brake actuator 88 is controlled to acquire the desired brake torque acquired by the footbrake.

The operation controller 91 can perform a cruise operation control based on cruise traveling in which traveling is performed by the driver performing driving operations such as a steering operation other than an acceleration operation and a brake operation while at least one of the target vehicle speed or the target inter-vehicle distance with respect to the preceding vehicle set by the driver using the cruise control switch 83 is controlled to be maintained independently of an acceleration operation and a brake operation of the driver. The cruise operation control is an operation control for traveling by setting the target traveling state independently of a driving operation of the driver and automatically performing acceleration or deceleration based on the target traveling state in the same manner as the automatic operation control. In the first embodiment, the manual operation control will be referred to as a first operation control, and each of the automatic operation control and the cruise operation control will be referred to as a second operation control. Thus, the operation controller 91 can selectively perform the first operation control for traveling based on a driving operation of the driver and the second operation control for traveling by setting the target traveling state independently of a driving operation of the driver and automatically performing acceleration or deceleration based on the target traveling state.

As the automatic operation control, the operation controller 91 can selectively perform an unmanned automatic operation control and a manned automatic operation control. The unmanned automatic operation control is the automatic operation control based on unmanned traveling in which acceleration or deceleration and steering are automatically performed in the absence of an occupant in the vehicle 10. The manned automatic operation control is the automatic operation control based on manned traveling in which acceleration or deceleration and steering are automatically performed in the presence of an occupant in the vehicle 10. As the second operation control, the operation controller 91 can selectively perform an unmanned second operation control (unmanned automatic operation control) and a manned second operation control (manned automatic operation control). The unmanned second operation control is the second operation control based on the unmanned traveling in which acceleration or deceleration is automatically performed in the absence of an occupant in the vehicle 10. The manned second operation control is the second operation control based on manned traveling in which acceleration or deceleration is automatically performed in the presence of an occupant in the vehicle 10.

The operation controller 91 outputs instructions to control the engine 12 and the rotating devices MG1, MG2 to the hybrid controller 94. The hybrid controller 94 includes engine control means, that is, an engine controller 95, and rotating device control means, that is, a rotating device controller 96. The engine controller 95 controls the operation of the engine 12. The rotating device controller 96 controls the operation of each of the first rotating device MG1 and the second rotating device MG2 through the inverter 50. The hybrid controller 94 executes output controls for each of the engine 12, the first rotating device MG1, and the second rotating device MG2. Hereinafter, controls performed by the hybrid controller 94 will be specifically described illustratively in the case of the manual operation control based on normal traveling.

The hybrid controller 94 calculates the requested drive torque for the drive wheels 14 by applying the accelerator operation amount θacc and the vehicle speed V to a relationship (for example, a drive torque map) that is acquired in advance by experiment or design and stored (that is, determined in advance). In each operation control of the cruise operation control, the unmanned automatic operation control, and the manned automatic operation control, the requested drive torque for implementing each operation control is calculated (refer to FIG. 2 for the automatic operation control).

The hybrid controller 94 outputs instruction signals (the engine control instruction signal Se and the rotating device control instruction signal Smg) for controlling the engine 12, the first rotating device MG1, and the second rotating device MG2 to realize the requested drive torque by considering the chargeable electric power Win, the dischargeable electric power Wout, and the like of the battery 52. For example, the engine control instruction signal Se is an instruction value of engine power Pe that is the power of the engine 12 for outputting the engine torque Te at the engine rotational speed Ne. For example, the rotating device control instruction signal Smg is an instruction value of electric power generated by the first rotating device MG1 for outputting the reaction force torque (the MG1 torque Tg at the MG1 rotational speed Ng) of the engine torque Te, and is an instruction value of electric power consumption of the second rotating device MG2 for outputting the MG2 torque Tm at the MG2 rotational speed Nm.

Figure 3:
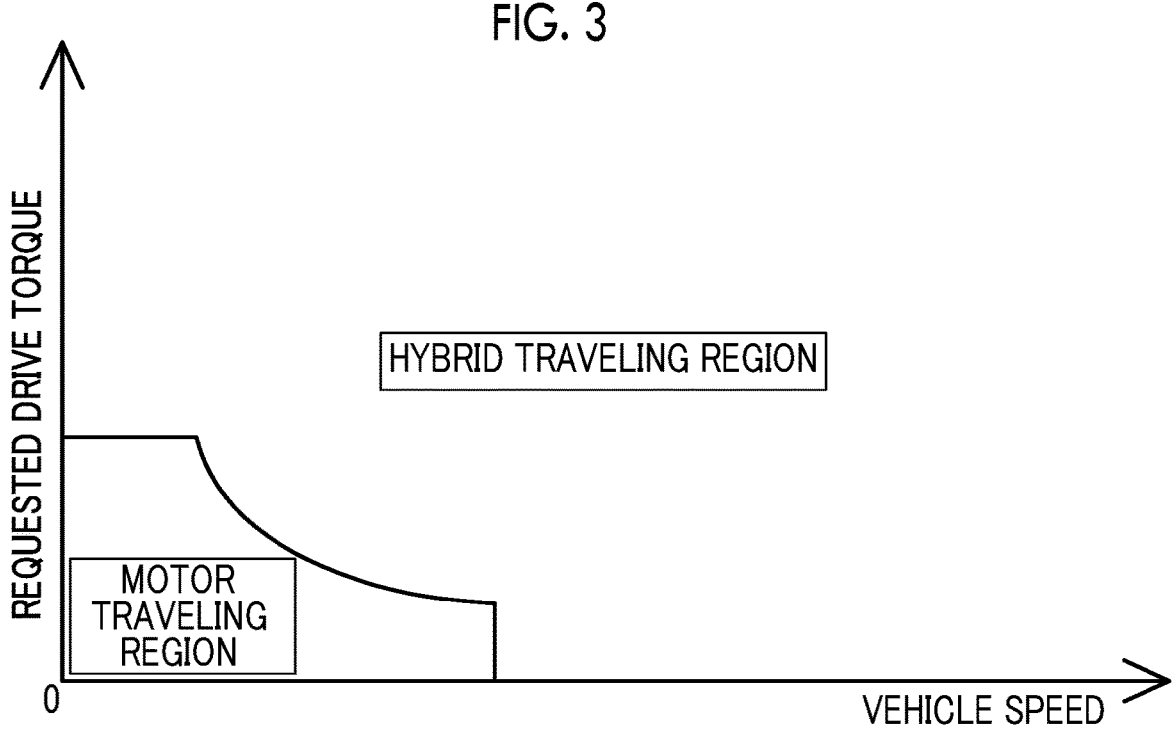
FIG. 3 is a graph illustrating one example of an EV/HV region map used in switching between EV traveling and HV traveling.

The hybrid controller 94 selectively establishes a motor traveling (referred to as EV traveling) mode and a hybrid traveling (referred to as HV traveling) mode as a traveling mode depending on the traveling state. For example, the hybrid controller 94 applies the vehicle speed V and the requested drive torque to a relationship (EV/HV region map) determined in advance that includes a switching line (solid line) dividing a region in a two-dimensional coordinate system taking the vehicle speed V and the requested drive torque as variables into an EV traveling region and an HV traveling region as illustrated in FIG. 3. When the hybrid controller 94 determines that the vehicle state falls in the EV traveling region, the hybrid controller 94 establishes the EV traveling mode. When the hybrid controller 94 determines that the vehicle state falls in the HV traveling region, the hybrid controller 94 establishes the HV traveling mode. In FIG. 3, the EV traveling region is set in a low vehicle speed region where the vehicle speed V is relatively low, and a low drive torque region where the requested drive torque is relatively low such that the requested drive torque can be acquired with merely the MG2 torque Tm. Even when the vehicle state falls in the EV traveling region, the hybrid controller 94 establishes the HV traveling mode when the battery SOC value is less than an engine start-up threshold. In each operation control of the cruise operation control, the unmanned automatic operation control, and the manned automatic operation control, the EV traveling mode and the HV traveling mode are selectively established in the same manner as the manual operation control.

When the hybrid controller 94 establishes the EV traveling mode, the hybrid controller 94 stops the operation of the engine 12 and enables the EV traveling in which merely the second rotating device MG2 is used as a traveling power source using the electric power from the battery 52.

When the hybrid controller 94 establishes the HV traveling mode, the hybrid controller 94 enables the HV traveling in which traveling is performed by transmitting the directly transmitted engine torque to the drive gear 24 by receiving the reaction force with respect to the power of the engine 12 as the electric power generated by the first rotating device MG1, and transmitting a torque to the drive wheels 14 by driving the second rotating device MG2 with the electric power generated by the first rotating device MG1. In the HV traveling mode, traveling can be performed with an additional drive torque that is generated by the second rotating device MG2 using the electric power from the battery 52. As described above, the second rotating device MG2 is a rotating device that generates a drive torque using the electric power supplied from the battery 52, as illustrated in the aspect in the EV traveling mode.

The hybrid controller 94 (particularly, the engine controller 95) starts up the engine 12 by establishing the HV traveling mode when the vehicle state transitions to the HV traveling region from the EV traveling region at a stoppage of the operation of the engine 12, or when the battery SOC value is decreased below the engine start-up threshold at a stoppage of the operation of the engine 12. The engine controller 95 starts up the engine 12 by performing ignition after increasing the engine rotational speed Ne using the first rotating device MG1. That is, the engine controller 95 starts up the engine 12 by cranking the engine 12 using the powering of the first rotating device MG1. When the engine 12 is started up after the battery SOC value is decreased below the engine start-up threshold, the hybrid controller 94 causes the first rotating device MG1 to generate electric power using the power of the engine 12 after the completion of engine start-up, and stores the electric power generated by the first rotating device MG1 in the battery 52. Accordingly, the battery 52 is charged using the power of the engine 12. The first rotating device MG1 is a rotating device that generates electric power for charging the battery 52 using the power of the engine 12 and rotationally drives the engine 12 using the electric power supplied from the battery 52 when the engine 12 is started up.

At the time of engine start-up using the first rotating device MG1, the hybrid controller 94 causes the second rotating device MG2 to output a reaction force canceling torque for suppressing a decrease in drive torque caused by the reaction force torque with respect to a cranking torque of the first rotating device MG1. Thus, in the EV traveling mode, the output electric power of the battery 52 corresponding to the generation of the cranking torque of the first rotating device MG1 and the reaction force canceling torque of the second rotating device MG2 needs to be maintained in preparation for engine start-up. When the output electric power of the battery 52 needed for engine start-up is not maintained at engine start-up, a part of the output electric power of the battery 52 corresponding to the generation of the drive torque is used for engine start-up. Thus, a shock accompanied by engine start-up is generated, and there is a possibility of deterioration in drivability. In addition, when the output electric power of the battery 52 needed for engine start-up is not securely maintained at engine start-up, the engine rotational speed Ne is not smoothly increased in the process of engine start-up (that is, a time period needed for engine start-up is lengthened), and there is a possibility of deterioration in drivability. From such a viewpoint, the upper limit of the drive torque in the EV traveling region (in other words, the upper limit value of the MG2 torque Tm that is permitted to be generated as the drive torque in the EV traveling mode) is determined in advance by considering the output electric power of the battery 52 needed for engine start-up (that is, in order to suppress deterioration in drivability at engine start-up). As described above, for example, in the region where the battery SOC value is low, the dischargeable electric power Wout is decreased as the battery SOC value is decreased. When the dischargeable electric power Wout is decreased, the output electric power of the battery 52 needed for engine start-up is not easily maintained, and the battery SOC value needs to be increased by charging the battery 52. From such a viewpoint, the engine start-up threshold is determined in advance as the lower limit value of the battery SOC value for maintaining the output electric power of the battery 52 needed for engine start-up in order to suppress deterioration in drivability at engine start-up. In other words, the engine start-up threshold is a threshold that is determined in advance for determining the battery SOC value at which the battery 52 needs to be charged by forcedly starting up the engine 12.

The hybrid controller 94 (particularly, the rotating device controller 96) can selectively execute a drive control based on pulse width modulation (PWM) control (particularly, sine wave PWM control) and a drive control based on rectangular wave control as a drive control of each rotating device.

Figure 4:
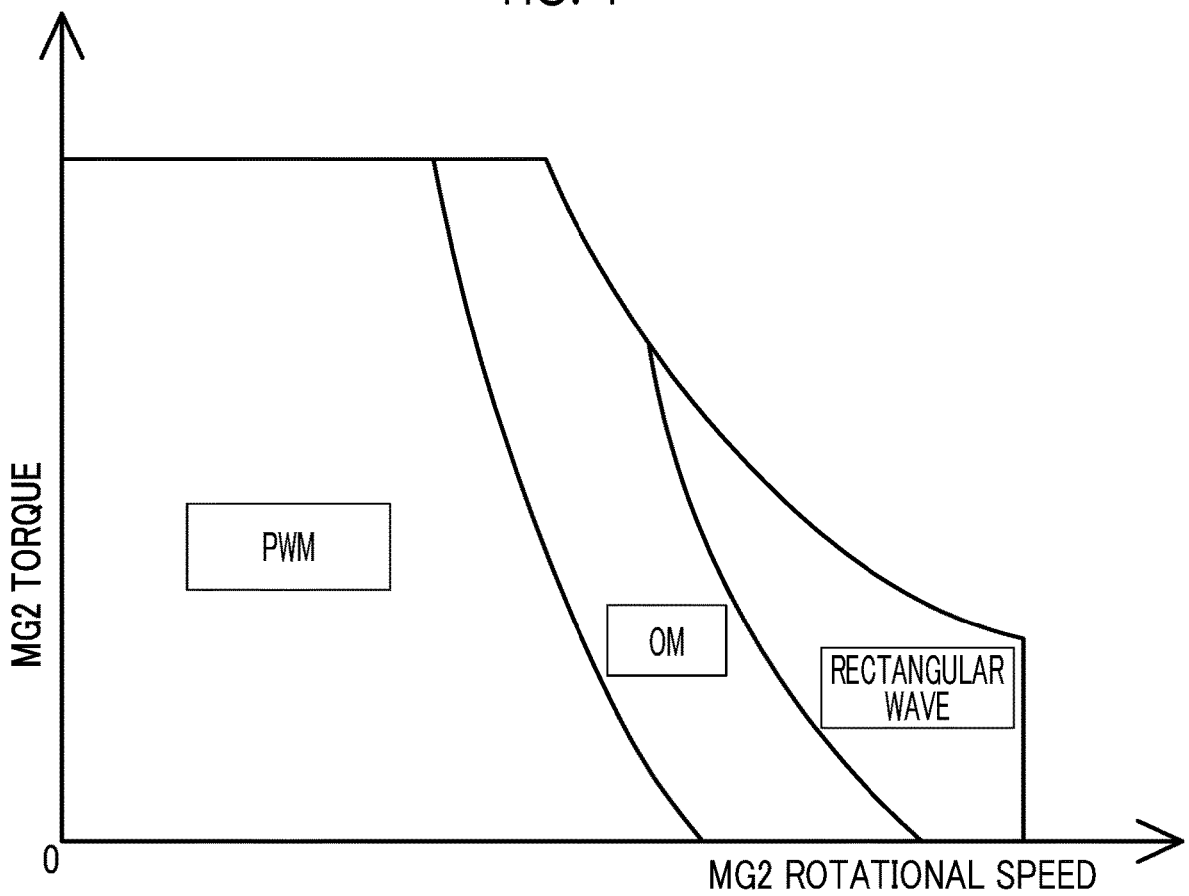
FIG. 4 is a graph illustrating a characteristic of a second rotating device represented by an MG2 rotational speed and an MG2 torque.

FIG. 4 is a graph illustrating a characteristic of the second rotating device MG2 represented by the MG2 rotational speed Nm and the MG2 torque Tm. In FIG. 4, a region where each drive control of the second rotating device MG2 is performed is illustrated. In FIG. 4, when the second rotating device MG2 is in a relatively low output (power) region, the rotating device controller 96 performs the drive control based on the PWM control that enables a relatively high precision control. When the second rotating device MG2 is in a relatively high output (power) region, the rotating device controller 96 performs the drive control based on the rectangular wave control that is a relatively low precision control in which the number of times of switching is lower than that in the PWM control. That is, as illustrated in FIG. 4, the region where the power of the second rotating device MG2 is relatively low is set as a PWM region where the drive control based on the PWM control is performed (refer to the region "PWM" in FIG. 4). The region where the power of the second rotating device MG2 is relatively high is set as a rectangular wave region where the drive control based on the rectangular wave control is performed (refer to the region "RECTANGULAR WAVE" in FIG. 4). The region illustrated by "OM" in FIG. 4 is a region where a drive control based on overmodulation PWM control is performed. The first rotating device MG1 may be controlled in the same manner as the second rotating device MG2.

The rotating device controller 96 suppresses vibrations generated in the vehicle 10 with a damping control using a rotating device. For example, vibrations generated in the vehicle 10 include a vibration generated in the process of starting up the engine 12, a vibration generated in the process of stopping the engine 12, a vibration accompanied by torsion in a power transmission system at the time of acceleration, and a vibration accompanied by traveling on a wavy road. For example, when the rotating device controller 96 detects vibrations of the vehicle 10, the rotating device controller 96 executes the damping control using a rotating device by causing the second rotating device MG2 to generate a change in torque in antiphase with the vibrations to cancel the vibrations of the vehicle 10. The first rotating device MG1 may be controlled in the same manner.

The damping control using the rotating device needs relatively high acceleration responsiveness and thus, is executed merely when the rotating device can be controlled with high precision. That is, the rotating device controller 96 executes the damping control using the rotating device merely in the drive control based on the PWM control.

The input voltage setting unit 98 sets the system voltage Vsys in accordance with the operating state of the vehicle 10. For example, the operating state of the vehicle 10 is an operating state that is represented by the output torque and the rotational speed of the rotating device (MG1 and MG2). The input voltage setting unit 98 sets the system voltage Vsys in accordance with the output torque and the rotational speed of the rotating device (MG1 and MG2). For example, the output torque of the rotating device (MG1 and MG2) is the output torque of the larger one of the MG1 torque Tg or the MG2 torque Tm when the requested drive torque is realized. The rotational speed of the rotating device (MG1 and MG2) is the rotational speed of the rotating device corresponding to the output torque of the larger one of the MG1 torque Tg or the MG2 torque Tm. In other words, the operating state that is represented by the output torque and the rotational speed of the rotating device (MG1 and MG2) is an operating state that is represented by the output power of the rotating device (MG1 and MG2). The output power of the rotating device (MG1 and MG2) is the output power of the larger one of the output power of the first rotating device MG1 or the output power of the second rotating device MG2 when the requested drive torque is realized. The operating state of the vehicle 10 may be an operating state (vehicle state) that is represented by the vehicle speed V and the requested drive torque of the vehicle 10. For example, the input voltage setting unit 98 sets the system voltage Vsys to be increased as the output torque (or output power) of the rotating device (MG1 and MG2) is increased, or as the requested drive torque (or the load of the vehicle 10 represented by the vehicle speed V and the requested drive torque) is increased.

The drive control based on the PWM control has better rotating device controllability but has a lower modulation rate (the ratio of a fundamental wave component (effective value) of the applied voltage of the rotating device to the system voltage Vsys) than the drive control based on the rectangular wave control. Thus, when the system voltage Vsys is relatively high, the PWM region (refer to the region "PWM" in FIG. 4) is enlarged to the high power region side of the rotating device. When the system voltage Vsys is relatively low, the rectangular wave region (refer to the region "RECTANGULAR WAVE" in FIG. 4) is shifted to the low power region side of the rotating device, and the PWM region is reduced. Accordingly, the rotating device controller 96 enlarges the operating region of the rotating device under the PWM control as the system voltage Vsys is increased.

When the system voltage Vsys is set to be low, electric power loss (switching loss) in the inverter 50 and the boost converter 51 is decreased, and fuel efficiency can be improved. However, in a situation where the drive torque is increased, when the system voltage Vsys is low, a delay in acceleration response is more easily caused than when the system voltage Vsys is high. When the drive control of the rotating device based on the PWM control cannot be performed because the system voltage Vsys is low, the damping control using the rotating device cannot be performed, and a shock is easily generated. In the second operation control (the automatic operation control and the cruise operation control) for traveling by automatically performing acceleration or deceleration, a situation where the traveling state of the vehicle 10 is rapidly changed is more restricted than that in the first operation control (manual operation control) for traveling based on a driving operation of the driver. Thus, in the second operation control, it is considered that even when a delay in acceleration response is caused by decreasing the system voltage Vsys, the delay in acceleration response does not occur frequently, and the delay in acceleration response is unlikely to be recognized by the driver. The first embodiment does not employ an aspect such that the system voltage Vsys is uniformly set in accordance with the operating state of the vehicle 10 regardless of the difference between the operation controls of the vehicle 10. In the first embodiment, fuel efficiency is improved by setting the system voltage Vsys by considering the difference between the operation controls of the vehicle 10.

The electronic control unit 90 further includes traveling state decision means, that is, a traveling state decision unit 99, in order to implement the manner of setting the system voltage Vsys by considering the difference between the operation controls of the vehicle 10.

The traveling state decision unit 99 decides whether or not the automatic operation control is being executed. When the traveling state decision unit 99 decides that the automatic operation control is being executed, the traveling state decision unit 99 decides whether or not the unmanned traveling is being performed. When the traveling state decision unit 99 decides that the automatic operation control is not being executed, the traveling state decision unit 99 decides whether or not the cruise traveling is being performed.

When the traveling state decision unit 99 decides that the automatic operation control is being executed, and that the unmanned traveling is being performed (that is, in the unmanned automatic operation control), the input voltage setting unit 98 sets a system voltage Vsys1 (in the unmanned traveling) as the system voltage Vsys. When the traveling state decision unit 99 decides that the automatic operation control is being executed, and that the unmanned traveling is not being performed (that is, in the manned automatic operation control), the input voltage setting unit 98 sets a system voltage Vsys2 (in the manned automatic operation) as the system voltage Vsys. When the traveling state decision unit 99 decides that the automatic operation control is not being executed, and that the cruise traveling is being performed (that is, in the cruise operation control), the input voltage setting unit 98 sets a system voltage Vsys3 (in the cruise traveling) as the system voltage Vsys. When the traveling state decision unit 99 decides that the automatic operation control is not being executed, and that the cruise traveling is not being performed (that is, in the manual operation control based on the normal traveling), the input voltage setting unit 98 sets a system voltage Vsys4 (in the normal traveling) as the system voltage Vsys.

In the second operation control (the automatic operation control and the cruise operation control), compared to the first operation control (manual operation control), it is considered that even when a delay in acceleration response is caused by decreasing the system voltage Vsys, the frequency of the delay in acceleration response is low, and the delay in acceleration response is unlikely to be recognized by the driver. In other words, it is desirable that acceleration responsiveness be more easily achieved in the first operation control than in the second operation control. In the second operation control, it is considered that a situation where high load operation does not occur, or a situation where a start-up or stoppage of the engine 12 does not occur can be predicted based on the traveling plan. In other words, in the second operation control, a situation where high load operation occurs, or a situation where a start-up or stoppage of the engine 12 occurs is predicted based on the traveling plan. When high load operation or a start-up or stoppage of the engine 12 is predicted to occur, it is considered that the system voltage Vsys may be increased before high load operation or a start-up or stoppage of the engine 12 occurs. From such a viewpoint, in the second operation control, the system voltage Vsys is set to be lower than that in the first operation control by prioritizing improvement in fuel efficiency over improvement in drivability. The input voltage setting unit 98 sets each of the system voltage Vsys1 (in the unmanned traveling), the system voltage Vsys2 (in the manned automatic operation), and the system voltage Vsys3 (in the cruise traveling) to a value lower than the system voltage Vsys4 (in the normal traveling). In the comparison between each system voltage Vsys, the value of the system voltage Vsys when the operating state of each rotating device represented by the output torque and the rotational speed of each rotating device is the same is compared. For example, the operating state of each rotating device is the same when the operating state (broadly, the power of the rotating device) represented by the output torque and the rotational speed of each rotating device is the same. Accordingly, the input voltage setting unit 98 sets the system voltage Vsys when the operating state of each rotating device is the same to be lower in the second operation control than in the first operation control.

When the input voltage setting unit 98 sets the system voltage Vsys to be lower in the second operation control than in the first operation control, and the operation controller 91 predicts high load operation to occur or a start-up or stoppage of the engine 12 to occur based on the traveling plan, the input voltage setting unit 98 sets the system voltage Vsys to be high to approximately the same voltage as that in the first operation control. Accordingly, it is possible to suppress a delay in acceleration response or suppress a shock caused by the incapability to perform the damping control using the rotating device.

In the automatic operation control, compared to the cruise operation control which is also the second operation control, it is considered that a delay in acceleration response is unlikely to be recognized by the driver, or it is considered that a situation where high load operation does not occur, or a situation where a start-up or stoppage of the engine 12 does not occur can be easily predicted. From such a viewpoint, in the automatic operation control, the system voltage Vsys is set to be lower than that in the cruise operation control by prioritizing improvement in fuel efficiency. The input voltage setting unit 98 sets each of the system voltage Vsys1 (in the unmanned traveling) and the system voltage Vsys2 (in the manned automatic operation) to a value lower than the system voltage Vsys3 (in the cruise traveling).

In the unmanned traveling which is traveling under the unmanned automatic operation control, it is considered that a shock caused by the incapability to perform the damping control using the rotating device is not recognized, and that a delay in acceleration response is not recognized, compared to the manned traveling which is also traveling under the automatic operation control but is traveling under the manned automatic operation control. In the unmanned traveling, a shock or a delay in acceleration response does not need to be considered. Thus, the unmanned traveling is considered to have a higher degree of freedom in traveling plan or drive power adjustment than the manned traveling. From such a viewpoint, in the unmanned traveling, the system voltage Vsys is set to be lower than that in the manned traveling by prioritizing improvement in fuel efficiency. The input voltage setting unit 98 sets the system voltage Vsys1 (in the unmanned traveling) to a value lower than the system voltage Vsys2 (in the manned automatic operation). Accordingly, the input voltage setting unit 98 sets the system voltage Vsys when the operating state of each rotating device is the same to be lower in the unmanned automatic operation control than in the manned automatic operation control. As described above, in the automatic operation control, the system voltage Vsys is set to be lower than that in the cruise operation control. Thus, the input voltage setting unit 98 sets the system voltage Vsys when the operating state of each rotating device is the same to be lower in the unmanned second operation control (unmanned automatic operation control) than in the manned second operation control (the manned automatic operation control and the cruise operation control).

For each operation control of the vehicle 10, a relative relationship of the system voltage Vsys when the operating state of each rotating device is the same is system voltage Vsys1 (in the unmanned traveling)<system voltage Vsys2 (in the manned automatic operation)<system voltage Vsys3 (in the cruise traveling)<system voltage Vsys4 (in the normal traveling). As the system voltage Vsys is decreased, fuel efficiency is prioritized. As the system voltage Vsys is increased, drivability (for example, shock suppression and improvement in acceleration responsiveness) is prioritized.

Figure 5:
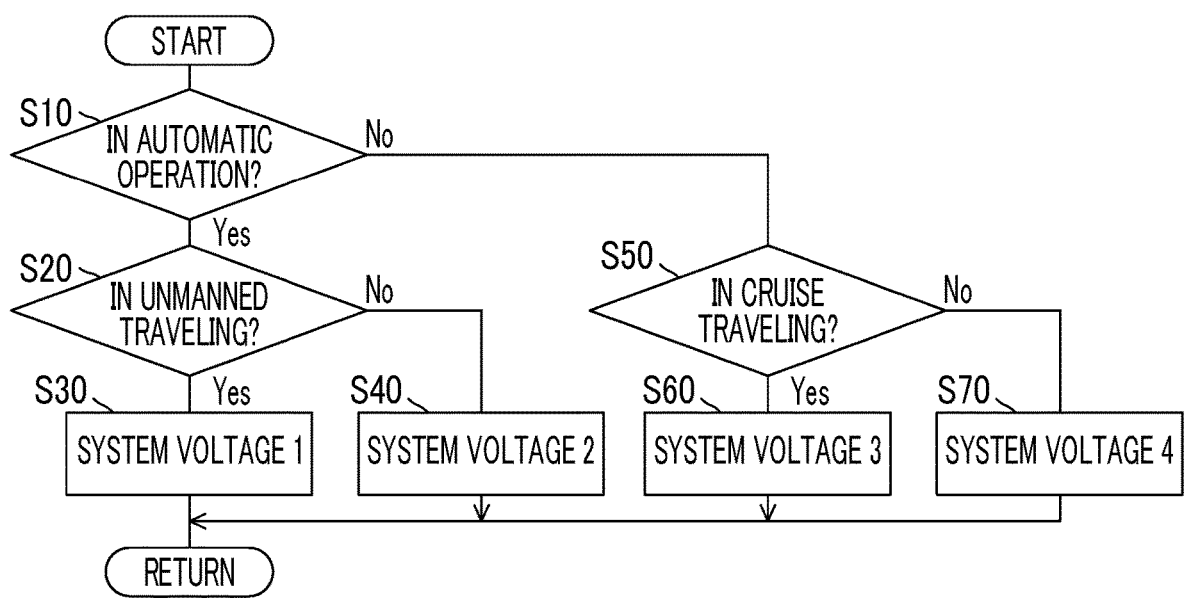
FIG. 5 is a flowchart for describing a main part of a control operation of an electronic control unit, that is, a control operation for improving fuel efficiency in a vehicle that can selectively perform a first operation control and a second operation control.

FIG. 5 is a flowchart for describing a main part of a control operation of the electronic control unit 90, that is, a control operation for improving fuel efficiency in the vehicle that can selectively perform the first operation control and the second operation control. The flowchart is repeatedly executed.

In FIG. 5, first, a decision as to whether or not the automatic operation control is being executed is performed in step (hereinafter, "step" will be omitted) S10 that corresponds to the function of the traveling state decision unit 99. When a positive determination is made in S10, a decision as to whether or not the unmanned traveling is being performed is performed in S20 that corresponds to the function of the traveling state decision unit 99. When a positive determination is made in S20, the system voltage Vsys1 (in the unmanned traveling) is set as the system voltage Vsys in S30 that corresponds to the function of the input voltage setting unit 98. In the unmanned automatic operation control, compared to the manned automatic operation control, a shock caused by the incapability to perform the damping control using the rotating device is not recognized, and a delay in acceleration response is not recognized. Thus, in the unmanned automatic operation control, fuel efficiency is improved by setting the system voltage Vsys1 (in the unmanned traveling) having a low value. When a negative determination is made in S20, the system voltage Vsys2 (in the manned automatic operation) is set as the system voltage Vsys in S40 that corresponds to the function of the input voltage setting unit 98. In the automatic operation control, compared to the cruise operation control which is also the second operation control, a delay in acceleration response is unlikely to be recognized by the driver, or a situation where high load operation does not occur, or a situation where a start-up or stoppage of the engine 12 does not occur can be easily predicted. Thus, in the automatic operation control, fuel efficiency is improved by setting the system voltage Vsys2 (in the manned automatic operation) having a low value. When a negative determination is made in S10, a decision as to whether or not the cruise traveling is being performed is performed in S50 that corresponds to the function of the traveling state decision unit 99. When a positive determination is made in S50, the system voltage Vsys3 (in the cruise traveling) is set as the system voltage Vsys in S60 that corresponds to the function of the input voltage setting unit 98. In the cruise operation control, compared to the manual operation control, a delay in acceleration response is unlikely to be recognized by the driver, or a situation where high load operation occurs, or a situation where a start-up or stoppage of the engine 12 occurs can be predicted to a certain extent. Thus, in the cruise operation control, fuel efficiency is improved by setting the system voltage Vsys3 (in the cruise traveling) having a low value. When a negative determination is made in S50, the system voltage Vsys4 (in the normal traveling) is set as the system voltage Vsys in S70 that corresponds to the function of the input voltage setting unit 98. In the manual operation control based on the normal traveling, drivability is improved by setting the system voltage Vsys4 (in the normal traveling) having a high value to achieve shock suppression or acceleration responsiveness in response to various operations of the driver.

According to the first embodiment, in the second operation control (the automatic operation control and the cruise operation control), the system voltage Vsys when the operating state of each rotating device is the same is set to be lower than in the first operation control (manual operation control). Thus, electric power loss in the inverter 50 or the boost converter 51 in the second operation control is decreased further than that in a case where the system voltage Vsys when the operating state of each rotating device is the same is set to the same value in the second operation control and the first operation control. In the second operation control, improvement in fuel efficiency is prioritized over improvement in drivability, and the system voltage Vsys is set to be lower than that in the first operation control. Thus, vehicle efficiency can be improved (that is, fuel efficiency can be improved) in the vehicle 10 that can selectively perform the first operation control and the second operation control.

According to the first embodiment, fuel efficiency can be improved in the vehicle 10 that executes the automatic operation control in the second operation control for traveling by automatically setting the target traveling state based on at least one of the map information or the road information and automatically performing acceleration or deceleration and steering based on the target traveling state.

According to the first embodiment, the system voltage Vsys is set in accordance with the operating state of the vehicle 10. Thus, fuel efficiency can be improved.

According to the first embodiment, the operating region of the rotating device under the PWM control is enlarged as the system voltage Vsys is increased. Thus, even when the system voltage Vsys is changed in the first operation control and the second operation control, the drive control of the rotating device is appropriately performed in accordance with the system voltage Vsys.

According to the first embodiment, the damping control using the rotating device is performed merely in the drive control based on the PWM control. Thus, vibrations in the vehicle 10 can be reduced more than usual in the drive control based on the PWM control.

According to the first embodiment, in the unmanned second operation control (unmanned automatic operation control), the system voltage Vsys when the operating state of each rotating device is the same is set to be lower than that in the manned second operation control (the manned automatic operation control and the cruise operation control). Thus, electric power loss in the inverter 50 or the boost converter 51 in the unmanned second operation control is decreased further than that in the manned second operation control. In the unmanned second operation control where a delay in acceleration response is not recognized, improvement in fuel efficiency is further prioritized than that in the manned second operation control, and fuel efficiency can be further improved by setting the system voltage Vsys to be low.

According to the first embodiment, in the second operation control, the system voltage Vsys when the operating state of the first rotating device MG1 is the same as the operating state of the second rotating device MG2 is set to be lower than that in the first operation control. Thus, electric power loss in the inverter 50 and the boost converter 51 in the second operation control is decreased.

Other embodiments of the present disclosure will be described. In the following description, common parts in the embodiments will be designated with the same reference signs and will not be described.

Hereinafter, a second embodiment of the present disclosure will be described.

While the system voltage Vsys is set for each operation control of the vehicle 10 in the first embodiment, the upper limit value of the system voltage Vsys may be set for each operation control instead of the system voltage Vsys. For example, the input voltage setting unit 98 sets the upper limit value of the system voltage Vsys in the second operation control (the automatic operation control and the cruise operation control) to set the system voltage Vsys set in the second operation control (the automatic operation control and the cruise operation control) to be lower than the system voltage Vsys set in the first operation control (manual operation control). In the second operation control, the rotating device controller 96 causes a drive torque to be generated within the range of the output torque of each rotating device restricted in accordance with the upper limit value of the system voltage Vsys.

When the system voltage Vsys in the second operation control is restricted to be lower than the system voltage Vsys set in the first operation control by setting the upper limit value of the system voltage Vsys for each operation control, each rotating device is easily driven in the drive control (for example, the drive control based on the rectangular wave control) having a high modulation rate (voltage usage rate). Thus, from such a point as well, the effect of improving fuel efficiency is achieved.

According to the second embodiment, in the second operation control, the system voltage Vsys is set to be lower than that in the first operation control by setting the upper limit value of the system voltage Vsys. Thus, the region of the system voltage Vsys where electric power loss in the inverter 50 and the boost converter 51 is decreased is used in the second operation control.

According to the second embodiment, in the second operation control, a drive torque is generated within the range of the output torque of each rotating device restricted in accordance with the upper limit value of the system voltage Vsys. Thus, the region of the system voltage Vsys where electric power loss in the inverter 50 and the boost converter 51 is decreased is appropriately used in the second operation control.

Hereinafter, a third embodiment of the present disclosure will be described.

In the third embodiment, a relative relationship of the system voltage Vsys for each operation control of the vehicle 10 different from the first embodiment will be illustrated.

In the unmanned automatic operation control, it is considered that a shock caused by the inability to perform the damping control using the rotating device is not recognized. From such a viewpoint, improvement in fuel efficiency is prioritized in the unmanned traveling. The input voltage setting unit 98 sets the system voltage Vsys1 (in the unmanned traveling) to a value lower than any value of the system voltage Vsys2 (in the manned automatic operation), the system voltage Vsys3 (in the cruise traveling), or the system voltage Vsys4 (in the normal traveling).

In the manned automatic operation control, compared to the cruise operation control or the manual operation control which is also the manned traveling, it is considered that the sensitivity of the driver to shock is high, and that a shock caused by the incapability to perform the damping control using the rotating device is easily recognized. From such a viewpoint, shock suppression is prioritized in the manned automatic operation control. The input voltage setting unit 98 sets the system voltage Vsys2 (in the manned automatic operation) to a value higher than any value of the system voltage Vsys3 (in the cruise traveling) or the system voltage Vsys4 (in the normal traveling).

In the cruise operation control, compared to the manual operation control, it is considered that the sensitivity of the driver to shock is high, and that a shock caused by the incapability to perform the damping control using the rotating device is easily recognized. From such a viewpoint, shock suppression is prioritized in the cruise operation control. The input voltage setting unit 98 sets the system voltage Vsys3 (in the cruise traveling) to a value higher than the value of the system voltage Vsys4 (in the normal traveling).

For each operation control of the vehicle 10, a relative relationship of the system voltage Vsys when the operating state of each rotating device is the same is system voltage Vsys1 (in the unmanned traveling)<system voltage Vsys4 (in the normal traveling)<system voltage Vsys3 (in the cruise traveling)<system voltage Vsys2 (in the manned automatic operation). As the system voltage Vsys is decreased, fuel efficiency is prioritized. As the system voltage Vsys is increased, drivability (particularly, shock suppression) is prioritized.

Hereinafter, a fourth embodiment of the present disclosure will be described.

When a shortage of electric power occurs at engine start-up, there is a possibility that a shock (referred to as an engine start-up shock) caused by the incapability to perform the damping control using the rotating device is generated. Regarding such a point, when there is an engine start-up request, the system voltage Vsys is temporarily (that is, for a predetermined period) boosted promptly in the fourth embodiment. That is, the input voltage setting unit 98 temporarily sets the system voltage Vsys to be high at the start-up of the engine 12. The system voltage Vsys before the increase is the system voltage Vsys set for each operation control of the vehicle 10.

Figure 6:
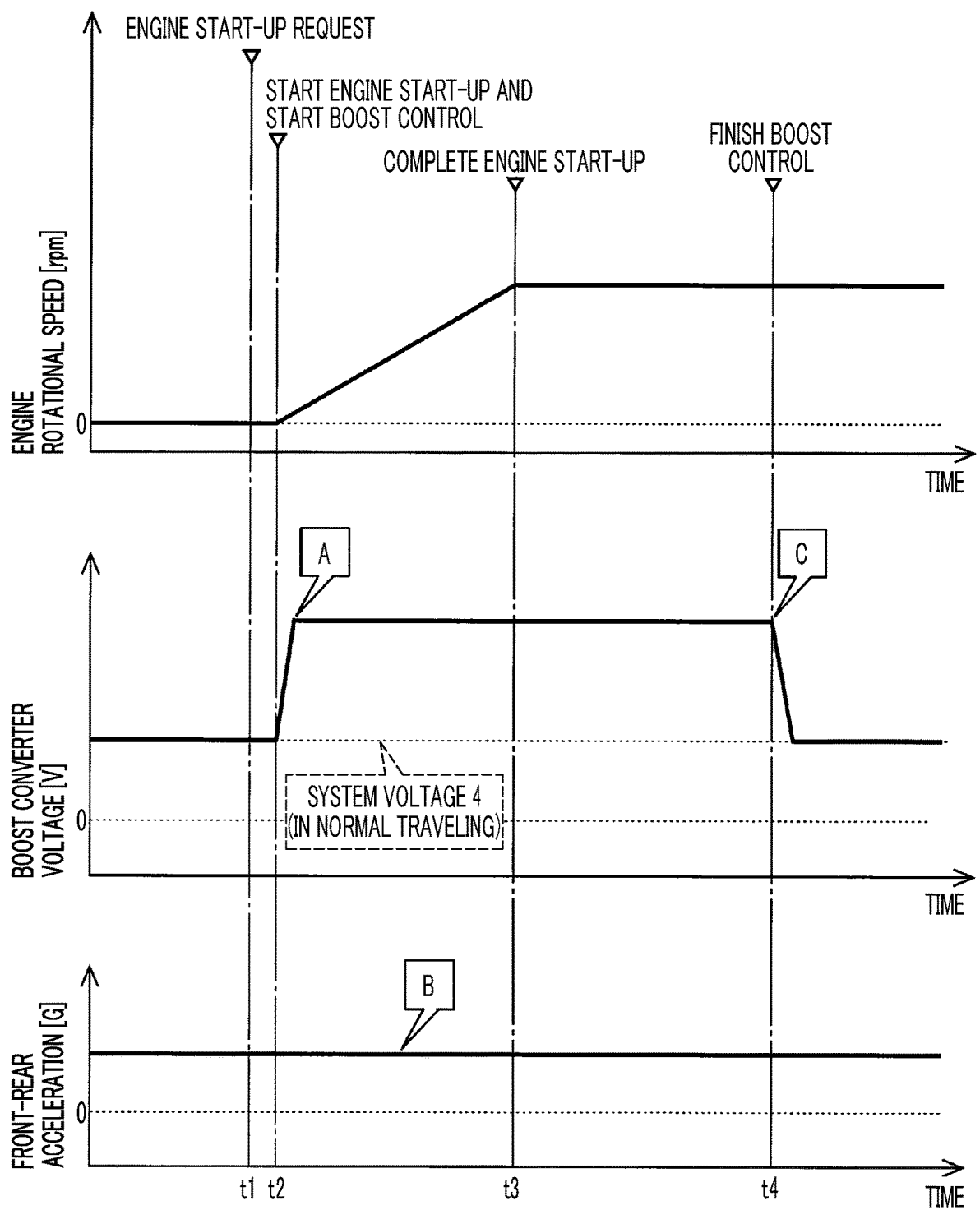
FIG. 6 is one example of a timing chart for describing an embodiment of a start-up control of an engine executed in a manual operation control.

FIG. 6 illustrates one example of a timing chart for describing an embodiment of a start-up control of the engine 12 executed in the manual operation control. In FIG. 6, time t1 represents a time when a request for starting up the engine 12 is made at the stoppage of the operation of the engine 12. Time t2 represents a time when the start-up control of the engine 12 is started in response to the request for starting up the engine 12. In addition, a boost control for temporarily setting the system voltage Vsys (here, the system voltage Vsys4 (in the normal traveling)) promptly to be high is started in response to the request for starting up the engine 12 (refer to part A). Accordingly, a shortage of power during the start-up control of the engine 12 is avoided or suppressed, and the engine start-up shock is avoided or suppressed by appropriately executing the damping control using the rotating device (refer to part B). Then, the engine rotational speed Ne is increased by cranking performed with the first rotating device MG1, and the engine 12 is started up (refer to time t2 to time t3). The start-up control of the engine 12 is completed (refer to time t3), and after elapse of a predetermined time period (refer to time t4) in which the operation of the engine 12 is stabilized, the boost control is finished (refer to part C).

When a boost time period TMup that is a time period in which the system voltage Vsys is temporarily set to be high at the start-up of the engine 12 is set to be short, an increase in electric power loss in the inverter 50 and the boost converter 51 is suppressed, and fuel efficiency can be improved. However, when the boost time period TMup is short, the engine start-up shock is more easily generated than when the boost time period TMup is long. It is considered that the sensitivity of the driver to shock differs due to the difference between the operation controls of the vehicle 10. The fourth embodiment does not employ an aspect such that the boost time period TMup is uniformly set regardless of the difference between the operation controls of the vehicle 10. In the fourth embodiment, fuel efficiency is improved by setting the boost time period TMup by considering the difference between the operation controls of the vehicle 10.

When the traveling state decision unit 99 decides that the automatic operation control is being executed, and that the unmanned traveling is being performed (that is, in the unmanned automatic operation control), the input voltage setting unit 98 sets a boost time period TMup1 (in the unmanned traveling) as the boost time period TMup. When the traveling state decision unit 99 decides that the automatic operation control is being executed, and that the unmanned traveling is not being performed (that is, in the manned automatic operation control), the input voltage setting unit 98 sets a boost time period TMup2 (in the manned automatic operation) as the boost time period TMup. When the traveling state decision unit 99 decides that the automatic operation control is not being executed, and that the cruise traveling is being performed (that is, in the cruise operation control), the input voltage setting unit 98 sets a boost time period TMup3 (in the cruise traveling) as the boost time period TMup. When the traveling state decision unit 99 decides that the automatic operation control is not being executed, and that the cruise traveling is not being performed (that is, in the manual operation control based on the normal traveling), the input voltage setting unit 98 sets a boost time period TMup4 (in the normal traveling) as the boost time period TMup.

In the manned automatic operation control, compared to each of the unmanned automatic operation control, the cruise operation control, and the manual operation control, it is considered that the sensitivity of the driver to shock is high, and that deterioration in drivability caused by the engine start-up shock is easily recognized. From such a viewpoint, suppression of the engine start-up shock is prioritized in the manned automatic operation control. The input voltage setting unit 98 sets the boost time period TMup2 (in the manned automatic operation) to a value longer than any value of the boost time period TMup1 (in the unmanned traveling), the boost time period TMup3 (in the cruise traveling), and the boost time period TMup4 (in the normal traveling).

In the cruise operation control, compared to each of the unmanned automatic operation control and the manual operation control, it is considered that the sensitivity of the driver to shock is high, and that deterioration in drivability caused by the engine start-up shock is easily recognized. From such a viewpoint, suppression of the engine start-up shock is prioritized in the cruise operation control. The input voltage setting unit 98 sets the boost time period TMup3 (in the cruise traveling) to a value longer than any value of the boost time period TMup1 (in the unmanned traveling) and the boost time period TMup4 (in the normal traveling). Accordingly, the input voltage setting unit 98 sets the boost time period TMup to be longer in the second operation control (particularly, the manned second operation control (the manned automatic operation control and the cruise operation control)) than in the first operation control (manual operation control).

In the manual operation control, compared to the unmanned automatic operation control, it is considered that the sensitivity of the driver to shock is high, and that deterioration in drivability caused by the engine start-up shock is easily recognized. From such a viewpoint, suppression of the engine start-up shock is prioritized in the manual operation control. The input voltage setting unit 98 sets the boost time period TMup4 (in the normal traveling) to a value longer than the boost time period TMup1 (in the unmanned traveling). Accordingly, the input voltage setting unit 98 sets the boost time period TMup to be longer in the manual operation control than in the unmanned automatic operation control. That is, the input voltage setting unit 98 sets the boost time period TMup to be shorter in the unmanned second operation control (unmanned automatic operation control) than in the first operation control (manual operation control).

A relative relationship of the boost time period TMup for each operation control of the vehicle 10 is boost time period TMup1 (in the unmanned traveling)<boost time period TMup4 (in the normal traveling)<boost time period TMup3 (in the cruise traveling)<boost time period TMup2 (in the manned automatic operation). As the boost time period TMup is shortened, fuel efficiency is prioritized. As the boost time period TMup is lengthened, drivability (particularly, suppression of the engine start-up shock) is prioritized.

Figure 7:
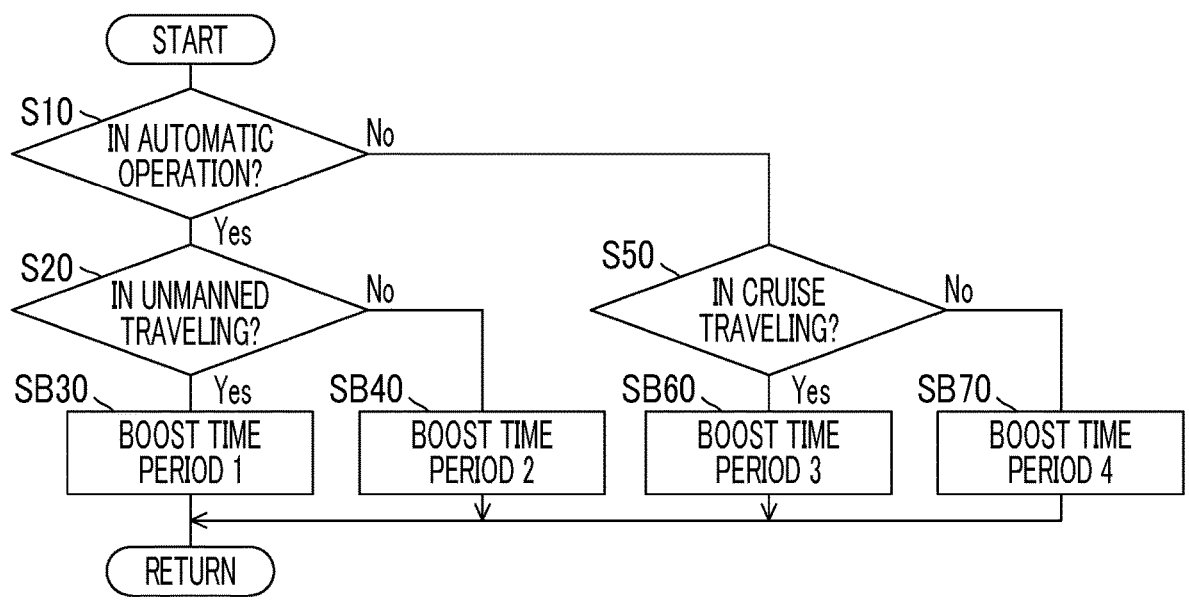
FIG. 7 is a flowchart for describing a main part of a control operation of the electronic control unit, that is, a control operation for improving fuel efficiency in the vehicle that can selectively perform the first operation control and the second operation control, in an embodiment different from FIG. 5.
Figure 8:
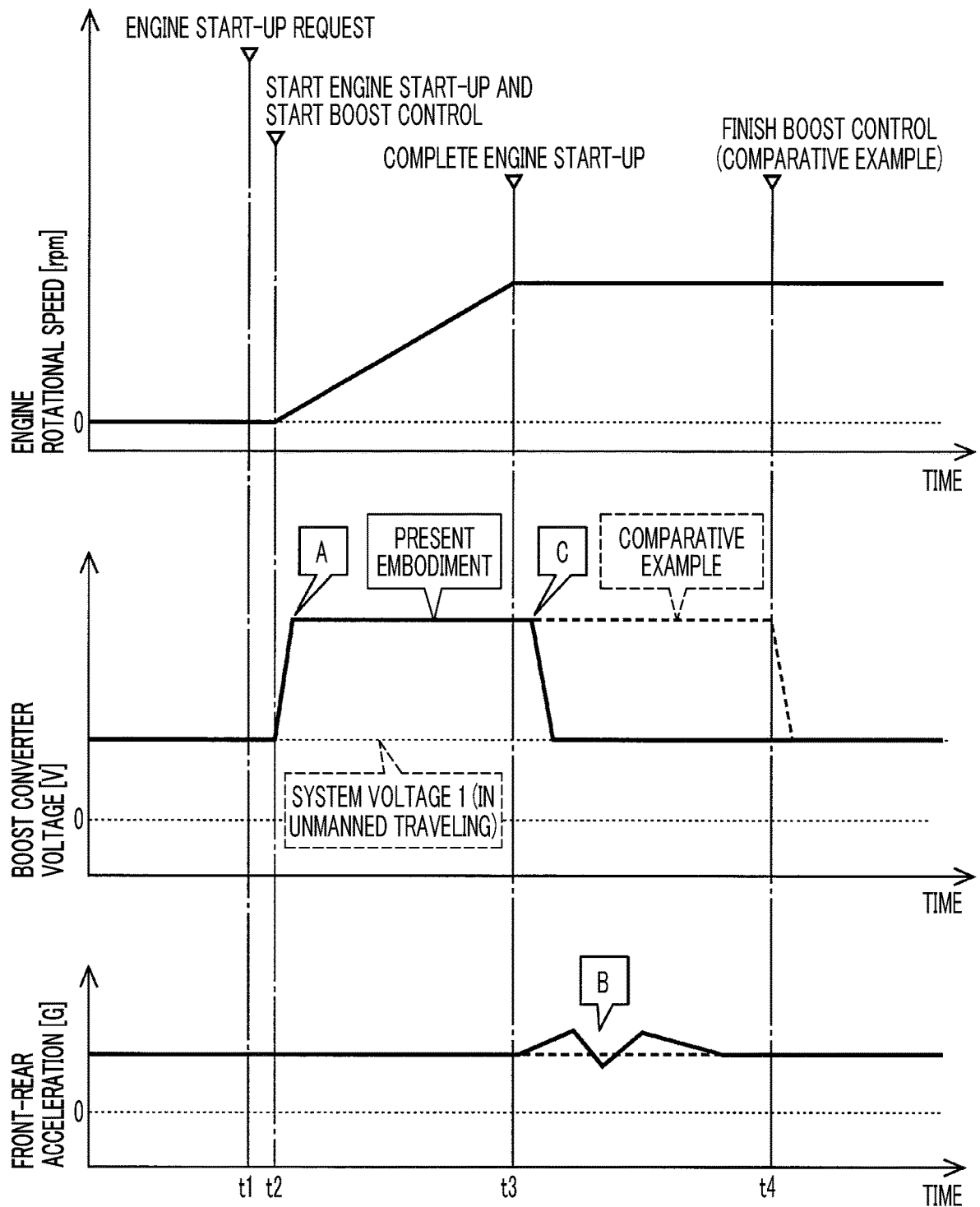
FIG. 8 is one example of a timing chart when the control operation illustrated in FIG. 7 is executed, and illustrates an aspect of the start-up control of the engine executed in an unmanned automatic operation control.
Figure 9:
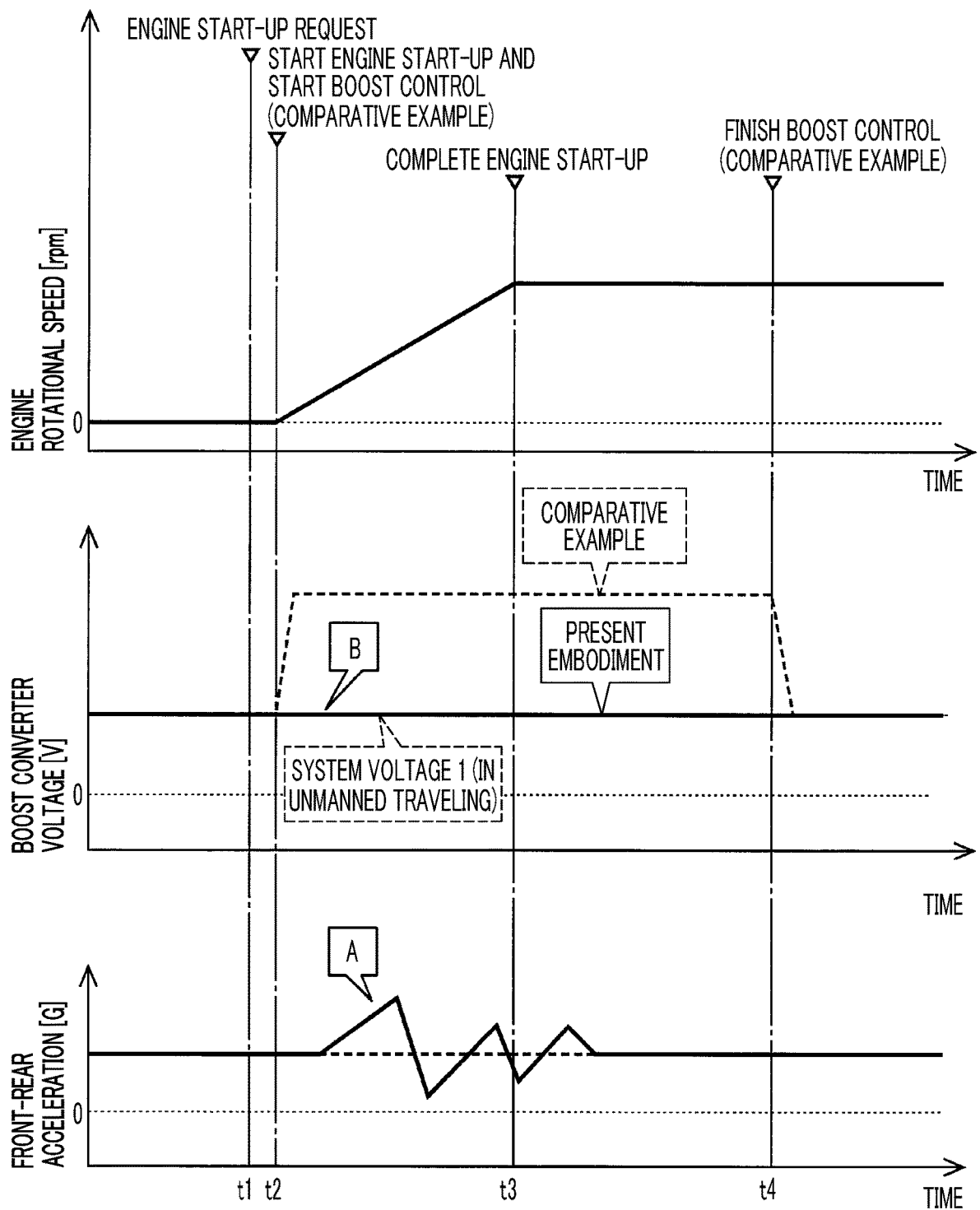
FIG. 9 is one example of a timing chart when the control operation illustrated in the flowchart in FIG. 7 is executed, and illustrates an embodiment, different from FIG. 8, of the start-up control of the engine executed in the unmanned automatic operation control.

FIG. 7 is a flowchart for describing a main part of a control operation of the electronic control unit 90, that is, a control operation for improving fuel efficiency in the vehicle that can selectively perform the first operation control and the second operation control. The flowchart is repeatedly executed. FIG. 8 and FIG. 9 are one example of a flowchart when the control operation illustrated in FIG. 7 is executed, and are diagrams illustrating an embodiment of the start-up control of the engine 12 executed in the unmanned automatic operation control.

In FIG. 7, first, a decision as to whether or not the automatic operation control is being executed is performed in S10 that corresponds to the function of the traveling state decision unit 99. When a positive determination is made in S10, a decision as to whether or not the unmanned traveling is being performed is performed in S20 that corresponds to the function of the traveling state decision unit 99. When a positive determination is made in S20, the boost time period TMup1 (in the unmanned traveling) is set as the boost time period TMup in SB30 that corresponds to the function of the input voltage setting unit 98. In the unmanned automatic operation control, compared to the manual operation control, deterioration in drivability caused by the engine start-up shock is not recognized. Thus, fuel efficiency is improved by setting the boost time period TMup1 (in the unmanned traveling) having a short value at engine start-up. When a negative determination is made in S20, the boost time period TMup2 (in the manned automatic operation) is set as the boost time period TMup in SB40 that corresponds to the function of the input voltage setting unit 98. In the manned automatic operation control, compared to the manual operation control and the cruise operation control, deterioration in drivability caused by the engine start-up shock is easily noticed. Thus, drivability is improved by setting the boost time period TMup2 (in the manned automatic operation) having a long value. When a negative determination is made in S10, a decision as to whether or not the cruise traveling is being performed is performed in S50 that corresponds to the function of the traveling state decision unit 99. When a positive determination is made in S50, the boost time period TMup3 (in the cruise traveling) is set as the boost time period TMup in SB60 that corresponds to the function of the input voltage setting unit 98. In the cruise operation control, compared to the manual operation control, deterioration in drivability caused by the engine start-up shock is easily noticed. Thus, drivability is improved by setting the boost time period TMup3 (in the cruise traveling) having a long value. When a negative determination is made in S50, the boost time period TMup4 (in the normal traveling) is set as the boost time period TMup in SB70 that corresponds to the function of the input voltage setting unit 98. In the manual operation control, the boost time period TMup that is determined in advance for suppressing deterioration in drivability at engine start-up while considering improvement in fuel efficiency is set as the boost time period TMup4 (in the normal traveling).

In FIG. 8, in the unmanned automatic operation control, the boost time period TMup1 (in the unmanned traveling) at engine start-up is set to a value shorter than the boost time period TMup4 (in the normal traveling) (refer to a comparative example illustrated by a broken line) to improve fuel efficiency. At the stoppage of the operation of the engine 12, a request for starting up the engine 12 is made (refer to time t1), and the start-up control of the engine 12 is started (refer to time t2). At such a time, the boost control for temporarily setting the system voltage Vsys (here, the system voltage Vsys1 (in the unmanned traveling)) promptly to be high in response to the request for starting up the engine 12 is started in order to avoid or suppress a shortage of power during the start-up control of the engine 12 (refer to part A). Then, the engine rotational speed Ne is increased by cranking performed with the first rotating device MG1, and the engine 12 is started up (refer to time t2 to time t3). The start-up control of the engine 12 is completed (refer to time t3). In the fourth embodiment illustrated by a solid line, after the completion of the start-up control of the engine 12, deterioration caused by a shock is permitted (refer to part B) even before the operation of the engine 12 is stabilized, and the boost control is finished earlier in order to improve fuel efficiency (refer to part C). The broken line is a comparative example in which the boost control is executed for the same time period as the boost time period TMup4 (in the normal traveling). In the comparative example, the damping control using the rotating device is appropriately executed, and the engine start-up shock is avoided or suppressed. Since the unmanned automatic operation control is performed in the fourth embodiment, improvement in fuel efficiency is prioritized over improvement in drivability.

In FIG. 9, in the unmanned automatic operation control, the boost time period TMup1 (in the unmanned traveling) at engine start-up is set to zero, and the boost control is not executed in order to improve fuel efficiency. At the stoppage of the operation of the engine 12, a request for starting up the engine 12 is made (refer to time t1), and the start-up control of the engine 12 is started (refer to time t2). At such a time, deterioration caused by a shock is permitted during the start-up control of the engine 12 (refer to part A), and the boost control for temporarily setting the system voltage Vsys (here, the system voltage Vsys1 (in the unmanned traveling)) to be high is not executed in order to improve fuel efficiency (refer to part B). The broken line is a comparative example in which the boost control is executed for the same time period as the boost time period TMup4 (in the normal traveling). In the comparative example, the damping control using the rotating device is appropriately executed, and the engine start-up shock is avoided or suppressed. Since the unmanned automatic operation control is performed in the fourth embodiment, improvement in fuel efficiency is prioritized over improvement in drivability.

According to the fourth embodiment, the system voltage Vsys is temporarily set to be high at the start-up of the engine 12. In the second operation control (particularly, the manned second operation control (the manned automatic operation control and the cruise operation control)), the boost time period TMup is longer at the start-up of the engine 12 than in the first operation control (manual operation control). Thus, improvement in drivability (for example, suppression of the engine start-up shock) is prioritized over improvement in fuel efficiency.

According to the fourth embodiment, the boost time period TMup in the manned second operation control (the manned automatic operation control and the cruise operation control) is longer than the boost time period TMup in the manual operation control. Thus, in the manned second operation control where the engine start-up shock is more easily recognized than that in the manual operation control, improvement in drivability is prioritized over improvement in fuel efficiency. The boost time period TMup in the unmanned second operation control (unmanned automatic operation control) is shorter than the boost time period TMup in the first operation control (manual operation control). Thus, in the unmanned second operation control where the engine start-up shock is not recognized, fuel efficiency can be improved.

Figure 10:
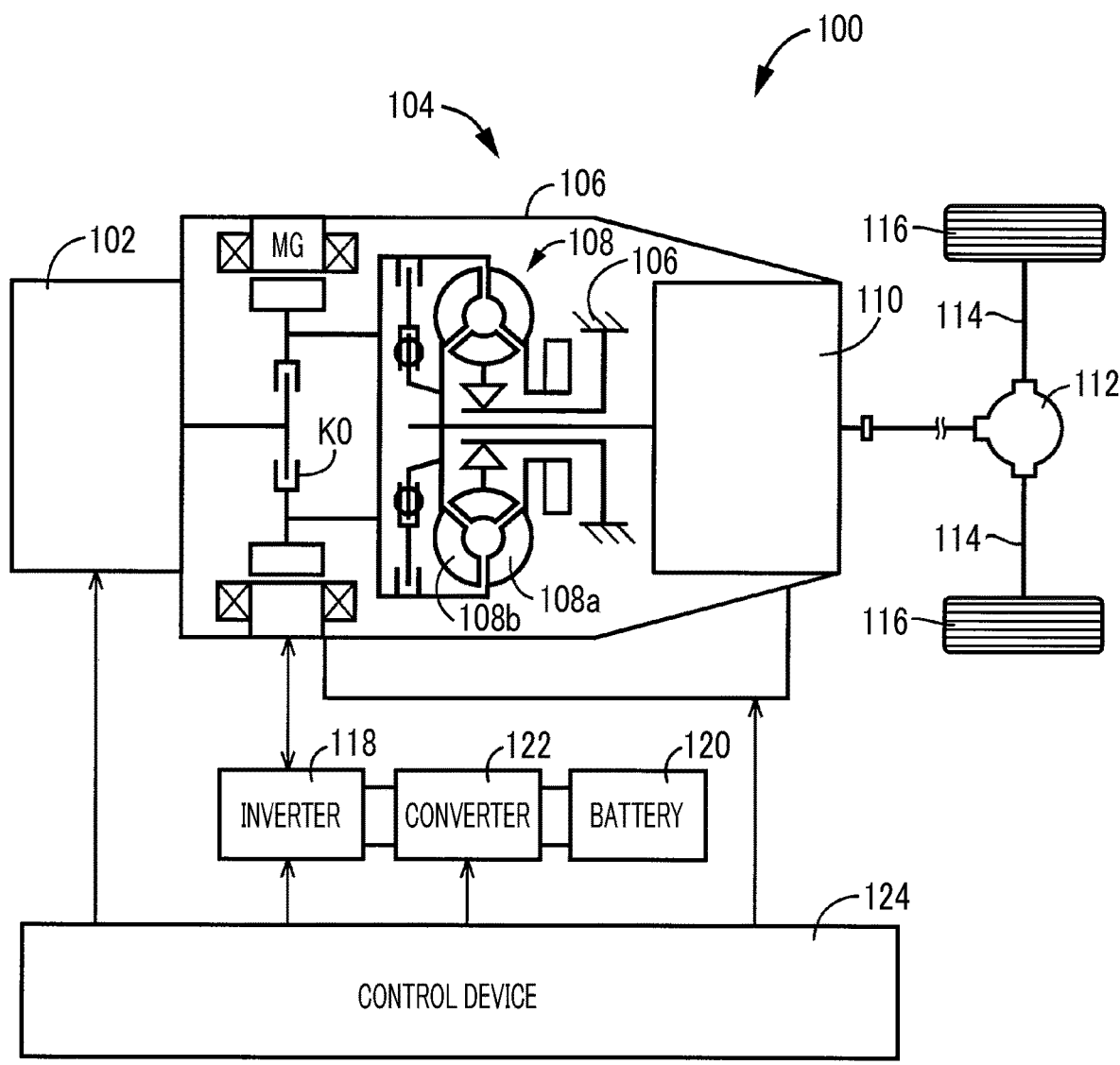
FIG. 10 is a diagram for describing a schematic configuration of a vehicle to which the present disclosure is applied, and is a diagram for describing a vehicle different from FIG. 1.

Hereinafter, a fifth embodiment of the present disclosure will be described. In the fifth embodiment, a vehicle 100 as illustrated in FIG. 10 will be illustrated. The vehicle 100 is different from the vehicle 10 that includes the shift unit 22 functioning as an electric continuously variable transmission illustrated in the first embodiment.

In FIG. 10, the vehicle 100 is a hybrid vehicle that includes an engine 102, a rotating device MG, and a power transmission device 104. The engine 102 and the rotating device MG can generate a drive torque. The power transmission device 104 includes a clutch K0, a torque converter 108, an automatic transmission 110, and the like in a case 106 in this order from the engine 102 side. The case 106 is a non-rotating member that is attached to the vehicle body.

The power transmission device 104 includes a differential gear device 112, an axle 114, and the like. A pump impeller 108a of the torque converter 108 is connected to the engine 102 through the clutch K0 and is also directly connected to the rotating device MG A turbine impeller 108b of the torque converter 108 is directly connected to the automatic transmission 110. In the power transmission device 104, at least one of the power of the engine 102 or the power of the rotating device MG is transmitted to drive wheels 116 included in the vehicle 100 through the clutch K0 (when the power of the engine 102 is transmitted), the torque converter 108, the automatic transmission 110, the differential gear device 112, the axle 114, and the like in this order. The vehicle 100 includes an inverter 118, a battery 120, a boost converter 122, and a control device 124. The inverter 118 controls the output torque of the rotating device MG. The battery 120 exchanges electric power with the rotating device MG through the inverter 118. The boost converter 122 is disposed between the inverter 118 and the battery 120 and boosts the inverter input voltage Vinv to a voltage higher than the battery voltage Vbat.

The control device 124 enables EV traveling in which merely the rotating device MG is used as a traveling power source using the electric power from the battery 120 in a state where the clutch K0 is disengaged, and where the operation of the engine 102 is stopped. The control device 124 can start up the engine 102 by controlling the clutch K0 to be engaged and causing the rotating device MG to output a cranking torque using the electric power from the battery 120. The control device 124 enables HV traveling in which the engine 102 is used as a traveling power source by operating the engine 102 in a state where the clutch K0 is engaged. In an HV traveling mode where the HV traveling is enabled, the control device 124 enables traveling using an additional drive torque that is generated by the rotating device MG using the electric power from the battery 120, or can cause the rotating device MG to generate electric power using the power of the engine 102 and store the electric power generated by the rotating device MG in the battery 120. Accordingly, the battery 120 is charged using the power of the engine 102 and also supplies electric power to the rotating device MG. The rotating device MG includes a function as an electric power generator that generates electric power for charging the battery 120 using the power of the engine 102, a function as a starter that rotationally drives the engine 102 using the electric power supplied from the battery 120 at a start-up of the engine 102, and a function as an electric motor that generates a drive torque using the electric power supplied from the battery 120.

The control device 124 includes the same functions as the functions of the operation controller 91 (the traveling plan generation unit 92 and the traveling controller 93), the hybrid controller 94 (the engine controller 95 and the rotating device controller 96), the input voltage setting unit 98, and the traveling state decision unit 99 included in the electronic control unit 90 in the first embodiment. The control device 124 can set the system voltage Vsys and the boost time period TMup by considering the difference between the operation controls of the vehicle 100 in the same manner as the electronic control unit 90.

According to the fifth embodiment, the same effect as the first to fourth embodiments is achieved.

While embodiments of the present disclosure are specifically described based on the drawings, the present disclosure is also applied to other aspects.

For example, while the vehicles 10, 100 that can perform the unmanned automatic operation control, the manned automatic operation control, the cruise operation control, and the manual operation control are illustrated in the embodiments, the present disclosure is not limited to such an aspect. For example, when an aspect such that the system voltage Vsys is set to be lower in the second operation control (the automatic operation control and the cruise operation control) than in the first operation control (manual operation control) is implemented, a vehicle that can perform the manned automatic operation control and the manual operation control may be used. In such a case, a relative relationship of the system voltage Vsys for each operation control of the vehicle is system voltage Vsys2 (in the manned automatic operation)<system voltage Vsys4 (in the normal traveling).

While the power transmission device 16 of the vehicle 10 in the first to fourth embodiments includes the planetary gear mechanism 40 which is a single pinion planetary gear device, and the shift unit 22 which functions as an electric continuously variable transmission, the present disclosure is not limited to such an aspect. For example, the power transmission device 16 may include an automatic transmission on the power transmission path between the shift unit 22 and the drive wheels 14. The automatic transmission is disposed in series with the shift unit 22. The shift unit 22 may be a shift mechanism in which the differential effect is restricted by controlling a clutch or a brake connected to a rotating element (the sun gear S, the carrier CA, and the ring gear R) of the planetary gear mechanism 40. The planetary gear mechanism 40 may be a double pinion planetary gear device. The planetary gear mechanism 40 may be a differential gear device in which a pinion rotationally driven by the engine 12 and a pair of bevel gears meshing with the pinion are operatively connected to the first rotating device MG1 and the drive gear 24. The planetary gear mechanism 40 may be a mechanism having a configuration in which two or more planetary gear devices are connected to each other at a part of rotating elements constituting each planetary gear device, and in which an engine, a rotating device, and drive wheels are connected to the rotating elements of each planetary gear device in a manner allowing transmission of power.

In the fifth embodiment, the vehicle 100 may be a vehicle in which the clutch K0 is not included, and in which the engine 102 and the rotating device MG are directly connected to the input side of the torque converter 108. The point is that the present disclosure can be applied to a vehicle including an engine, a rotating device that can generate a drive torque, an inverter that controls the output torque of the rotating device, a battery that is connected to a boost converter to supply electric power to the rotating device through the inverter and the boost converter, and the boost converter that is interposed between the inverter and the battery and boosts the input voltage of the inverter to a voltage higher than the output voltage of the battery. While the torque converter 108 is used as a hydraulic transmission device in the vehicle 100, other hydraulic transmission devices such as a hydraulic clutch that does not have the effect of multiplying a torque may be used. The torque converter 108 may not be disposed or may be replaced with a simple clutch.

While the vehicles 10, 100 are illustrated in the embodiments as a vehicle to which the present disclosure is applied, the present disclosure is not limited to such an aspect. For example, a vehicle to which the present disclosure is applied may be a series hybrid vehicle that can generate electric power with an electric power generation rotating device using the power of an engine and store the electric power generated by the electric power generation rotating device in a battery and also enables EV traveling by driving a drive rotating device using the electric power of the battery in a state where the operation of the engine is stopped. When an aspect such that the system voltage Vsys is set to be lower in the second operation control than in the first operation control is implemented, a vehicle to which the present disclosure is applied may be an electric vehicle that does not include an engine.

The above description is merely one embodiment, and the present disclosure can be embodied by carrying out various changes and improvements based on the knowledge of those skilled in the art.

What is claimed is:

1. A control device of a vehicle that includes a rotating device, an inverter, a battery, and a boost converter, the rotating device being configured to generate a drive torque of the vehicle, the inverter being configured to control an output torque of the rotating device, the battery being connected to the boost converter to supply electric power to the rotating device through the inverter and the boost converter, the boost converter being interposed between the inverter and the battery, the boost converter being configured to boost an input voltage of the inverter to a voltage higher than an output voltage of the battery, the control device comprising an electronic controller having circuitry, the electronic controller configured to:
    selectively execute a first operation control for traveling based on a driving operation of a driver and a second operation control for traveling by setting a target traveling state independently of the driving operation of the driver and automatically performing acceleration or deceleration based on the target traveling state, wherein the traveling is a time during which the vehicle is in motion; and
    set the input voltage of the inverter in the second operation control to be lower than the input voltage of the inverter in the first operation control when an operating state of the rotating device represented by the output torque and a rotational speed of the rotating device is not changed such that the input voltage of the inverter when the vehicle is in the second operation control for traveling, is lower than the input voltage of the inverter when the vehicle is in the first operation control for traveling.

2. The control device according to claim 1, wherein:
    the electronic controller is configured to automatically set the target traveling state based on at least one of map information or road information in the second operation control; and
    the electronic controller is configured to execute an automatic operation control for traveling by automatically performing acceleration or deceleration and steering based on the target traveling state in the second operation control.

3. The control device according to claim 1, wherein the electronic controller is configured to set the input voltage of the inverter in accordance with an operating state of the vehicle.

4. The control device according to claim 3, wherein the electronic controller is configured to set the input voltage of the inverter in accordance with the operating state represented by the output torque and the rotational speed of the rotating device or an operating state represented by a vehicle speed and a requested drive torque for the vehicle.

5. The control device according to claim 1, wherein the electronic controller is configured to set the input voltage of the inverter in the second operation control to be lower than the input voltage of the inverter in the first operation control by setting an upper limit value of the input voltage of the inverter in the second operation control.

6. The control device according to claim 5, wherein the electronic controller is configured to control the rotating device to generate the drive torque within a range of the output torque of the rotating device restricted in accordance with the upper limit value of the input voltage of the inverter in the second operation control.

7. The control device according to claim 1, wherein:
    the vehicle includes an engine;
    the electronic controller is configured to temporarily set the input voltage of the inverter to be high at a start-up of the engine; and
    the electronic controller is configured to set a boost time period in which the input voltage of the inverter is temporarily set to be high at the start-up of the engine in the second operation control, to be longer than a boost time period in which the input voltage of the inverter is temporarily set to be high at the start-up of the engine in the first operation control.

8. The control device according to claim 7, wherein:
    the electronic controller is configured to selectively execute, as the second operation control, an unmanned second operation control based on unmanned traveling in which the acceleration or deceleration is automatically performed in an absence of an occupant in the vehicle, and a maimed second operation control based on manned traveling in which the acceleration or deceleration is automatically performed in a presence of an occupant in the vehicle; and
    the electronic controller is configured to set the boost time period in the manned second operation control to be longer than the boost time period in the first operation control and set the boost time period in the unmanned second operation control to be shorter than the boost time period in the first operation control.

9. The control device according to claim 1, wherein:
    the electronic controller is configured to selectively execute, as a drive control of the rotating device, a drive control based on pulse width modulation control and a drive control based on rectangular wave control; and
    the electronic controller is configured to enlarge an operating region of the rotating device under the pulse width modulation control as the input voltage of the inverter is increased.

10. The control device according to claim 9, wherein the electronic controller is configured to execute a damping control using the rotating device merely in the drive control based on the pulse width modulation control.

11. The control device according to claim 1, wherein:
    the electronic controller is configured to selectively execute, as the second operation control, an unmanned second operation control based on unmanned traveling in which the acceleration or deceleration is automatically performed in an absence of an occupant in the vehicle, and a manned second operation control based on manned traveling in which the acceleration or deceleration is automatically performed in a presence of an occupant in the vehicle; and
    the electronic controller is configured to set the input voltage of the inverter in the unmanned second operation control to be lower than the input voltage of the inverter in the manned second operation control when the operating state of the rotating device is not changed.

12. The control device according to claim 1, wherein:
the vehicle includes an engine and a first rotating device that generates electric power for charging the battery using power of the engine and rotationally drives the engine using the electric power supplied from the battery at a start-up of the engine; and
the rotating device is a second rotating device that generates the drive torque using the electric power supplied from the battery.

13. The control device according to claim 1, wherein:
the vehicle includes an engine; and
the rotating device includes a function as an electric power generator that generates electric power for charging the battery using power of the engine, a function as a starter that rotationally drives the engine using the electric power supplied from the battery at a start-up of the engine, and a function as an electric motor that generates the drive torque using the electric power supplied from the battery.

* * * * *